(12) United States Patent
Asada et al.

(10) Patent No.: US 7,527,432 B2
(45) Date of Patent: May 5, 2009

(54) HYDRODYNAMIC BEARING TYPE ROTARY DEVICE AND RECORDING AND REPRODUCTION APPARATUS INCLUDING THE SAME

(75) Inventors: Takafumi Asada, Osaka (JP); Hiroaki Saito, Ehime (JP); Daisuke Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 412 days.

(21) Appl. No.: 11/492,166

(22) Filed: Jul. 25, 2006

(65) Prior Publication Data

US 2007/0140605 A1 Jun. 21, 2007

(30) Foreign Application Priority Data

Dec. 16, 2005 (JP) ............................. 2005-364050

(51) Int. Cl.
*F16C 32/06* (2006.01)
(52) U.S. Cl. ........................................ 384/107; 384/119
(58) Field of Classification Search ................. 384/100, 384/107–124; 360/99.08, 98.07
See application file for complete search history.

(56) References Cited

U.S. PATENT DOCUMENTS 4,445,793 A 5/1984 Shinohara 6,181,039 B1 * 1/2001 Kennedy et al. ............ 384/110
6,760,187 B2 7/2004 Asada et al.

FOREIGN PATENT DOCUMENTS

| JP | 2502674 | 11/1989 |
|----|---------|---------|
| WO | 2004/094848 | 11/2004 |

* cited by examiner

*Primary Examiner*—Thomas R Hannon
(74) *Attorney, Agent, or Firm*—Wenderoth, Lind & Ponack, L.L.P.

(57) ABSTRACT

A hydrodynamic bearing type rotary device which allows bubbles in a lubricating fluid to be surely discharged from a bearing portion is provided. A hydrodynamic bearing mechanism 40 of the hydrodynamic bearing type rotary device is formed of a sleeve 1, a shaft 2, a flange 3, a thrust plate 4, a seal cap 5, and oil 6. A first fluid reservoir F is formed between the sleeve 1, the flange 3, and the thrust plate 4. A second fluid reservoir H is formed between the sleeve 1 and the seal cap 5. In the sleeve 1, a communication hole G extending along an axial direction is formed. The first fluid reservoir F and the second fluid reservoir H communicate with each other through the communication hole G. The oil 6 is filled between the members. A capillary pressure is higher in the first fluid reservoir F than in the second fluid reservoir H.

20 Claims, 18 Drawing Sheets

HYDRODYNAMIC BEARING TYPE ROTARY DEVICE AND RECORDING AND REPRODUCTION APPARATUS INCLUDING THE SAME

CROSS-REFERENCE TO RELATED APPLICATIONS

This application claims priority to Japanese Patent Application Nos. JP2005-364050. The entire disclosures of Japanese Patent Application Nos. JP2005-364050 are hereby incorporated herein by reference.

BACKGROUND OF THE INVENTION

1. Field of the Invention

The present invention relates to a hydrodynamic bearing type rotary device utilizing a hydrodynamic bearing mechanism and a recording and reproduction apparatus including the same.

2. Background Information

In recent years, hard disc apparatuses using recording discs experience an increase in a memory capacity and an increase in a transfer rate for data. Thus, hydrodynamic bearing type rotary devices suitable for high-speed rotation are used as driving apparatuses for such a type of recording apparatuses.

The hydrodynamic bearing type rotary device mainly formed of, for example, a rotating member to which a recording disc is mounted, a stationary member attached to a housing or the like of the recording apparatus, and a hydrodynamic bearing mechanism for supporting the rotating member so as to be relatively rotatable with respect to the stationary member. Further, the hydrodynamic bearing mechanism is mainly formed of, for example, a tubular sleeve, a shaft positioned on an inner peripheral side of the sleeve so as to be relatively rotatable, a thrust flange fixed to an end of the shaft, a radial bearing portion having a radial dynamic pressure generation groove of a herringbone pattern which is formed on an outer peripheral surface of the shaft, and a thrust bearing portion having a thrust dynamic pressure generating groove of a spiral pattern which is formed on the thrust flange. Between the members of the hydrodynamic bearing mechanism, a lubricating fluid such as oil is filled.

In such a hydrodynamic bearing type rotary device, the rotating member rotates with respect to the stationary member by a rotation driving force generated at a magnetic circuit. As a result, the shaft and the sleeve rotate relatively, and the lubricating fluid flows in the radial bearing portion and the thrust bearing portion. Supporting pressures in a radial direction and an axial direction are produced at both of the bearing portions. This allows the shaft to rotate relatively to the sleeve in a non-contact state, and high-speed rotation of a recording disc can be achieved with a high precision.

However, when there is a bubble in the lubricating fluid, shortage of an oil film may occur in the radial bearing portion and the thrust bearing portion, which may result in deterioration in NPPRO and the like, and a desired bearing property cannot be obtained. Further, the shaft or the sleeve may slide directly on the surface of the other, causing a failure of the hydrodynamic bearing type rotary device.

Thus, a hydrodynamic bearing type rotary device including a hydrodynamic bearing mechanism of a circulation type which discharges bubbles in the lubricating body from the bearing portion by circulating the lubricating fluid (see WO2004/094848 A1). In this hydrodynamic bearing type rotary device, a cover having a circular shape is attached to an end of the sleeve. A fluid reservoir having a circular shape which communicates with the radial bearing portion is formed between the sleeve and the cover. Further, a communication hole which connects a space around the thrust bearing portion and the fluid reservoir is formed in the sleeve. This means that the radial bearing portion, the thrust bearing portion, the communication hole and the fluid reservoir form one communicating space.

In such a hydrodynamic bearing type rotary device, a pumping pressure generated at the radial bearing portion and the thrust bearing portion force the lubricating fluid to flow from the radial bearing portion to the thrust bearing portion, the communication hole, and the fluid reservoir, and to the radial bearing portion again to circulate. Bubbles in the bearing portions flow with the lubricating fluid and are eventually gathered to the fluid reservoir. The gathered bubbles are discharged from a hole provided on the cover. In this way, bubbles in the bearing portion are discharged to the outside one after another in this hydrodynamic bearing type rotary device, and failures caused by bubbles can be prevented.

However, in actual cases, even when the lubricating fluid circulates through the communication hole by a pumping pressure, the bubbles sometimes do not flow to the fluid reservoir with the lubricating fluid. For example, even though a circulating mechanism is used, bubbles often remain in a connection portion between the thrust bearing portion and the communicating hole, and do not flow into the fluid reservoir through communicating hole. This means that taking only the circulating force generated by a pumping pressure into account cannot completely solve the problem of poor discharge of the bubbles. The behavior of the bubbles cannot be explained simply by the factors such as dimensions, shapes and the like of the components. It is difficult to predict the behavior of the bubbles based on just the conventional wisdom. Thus, it is desired to elucidate the principle in the behavior of the bubbles and to utilize the principle in designing the hydrodynamic bearing type rotary device in order to realize stable discharge of bubbles.

SUMMARY OF THE INVENTION

An object of the present invention is to provide a hydrodynamic bearing type rotary device which ensures discharge of bubbles in a lubricating fluid from a bearing portion, and a recording and reproduction apparatus including the same.

The present inventors conducted various experimentations in order to elucidate the principle in the behavior of bubbles and found out that capillary pressures at an oil sump formed between the members or a communication hole largely influence the behavior of the bubbles.

As used herein, the capillary pressure refers to a pressure difference generated between two types of fluids which are insoluble to each other when they touch a surface of a solid due to a difference in their properties to wet the solid surface (wettability). The capillary pressure is determined by mainly, a surface tension and/or a contact angle of the fluid, a shape and material of a portion in which the fluid is filled, surface roughness, and the like.

In the hydrodynamic bearing type rotary device, two types of fluids are a lubricating fluid and bubbles therein. The solid is a sleeve, a seal cap, a hub, and a thrust plate. Based on the results of various experimentations, it is found that, when the bubbles are in the lubricating fluid in the hydrodynamic bearing type rotary device, the lubricating fluid tends to flow from an area with small capillary pressure to an area with a large capillary pressure, and it becomes easy for the bubbles to move from the area with a large capillary pressure to the area with a small capillary pressure as a counteraction. This phenomenon occurs because a force is applied to the lubricating fluid from the area with a small capillary pressure to the area with a large capillary pressure (hereinafter, the force is referred to as a capillary force), and the lubricating fluid tends to flow in a direction to which the capillary force is applied, causing a force to be applied to the bubbles in the direction opposite from that of the capillary force.

The hydrodynamic bearing type rotary device according to the first invention comprises a sleeve, a shaft, a seal cap, a thrust plate, a radial bearing portion, a first fluid reservoir, a second fluid reservoir, a communication hole, and a lubricating fluid. The sleeve has a bearing hole. The shaft is placed in the bearing hole so as to be relatively rotatable. The seal cap is fixed to one side in an axial direction of the sleeve. The thrust plate is fixed to the other side in the axial direction of the sleeve. The radial bearing portion has radial dynamic pressure generating grooves on at least one of an outer peripheral surface of the shaft and an inner peripheral surface of the sleeve. The first fluid reservoir communicates with the radial portion, and is formed between at least two of the sleeve, the shaft, and the thrust plate on the other side in the axial direction of the sleeve. The second fluid reservoir communicates with the radial bearing portion, and is formed between the sleeve and the seal cap. The communication hole is formed in the sleeve and communicates the first and the second fluid reservoirs. The lubricating fluid is held between the sleeve, the shaft, the seal cap and the thrust plate. A capillary pressure is higher in the first fluid reservoir than in the second fluid reservoir.

In this structure, the lubricating fluid tends to flow from the area with a small capillary pressure to the area with a large capillary pressure, i.e., from the second fluid reservoir to the first fluid reservoir. Thus, in the hydrodynamic bearing type rotary device, it is ensured that the bubbles in the lubricating fluid are discharged from the bearing portion.

The lubricating fluid may be, for example, oil, highly fluidic grease, ionic liquids and the like. The materials of the sleeve, the shaft and the thrust plate may be pure iron, stainless steel, copper alloy, sintered metal, and the like. The first and the second fluid reservoirs mean a space where the lubricating fluid does not generate a dynamic pressure as a supporting pressure for the shaft, and a space around the dynamic pressure generating grooves which generate a dynamic pressure is not included.

The hydrodynamic bearing type rotary device refers to not only a rotary device which includes a hydrodynamic bearing mechanism (for example, a spindle motor, or the like), but also a hydrodynamic bearing mechanism itself.

The hydrodynamic bearing type rotary device according to the second invention comprises a sleeve, a shaft, a hub, a thrust plate or closure plate, a radial bearing portion, a first fluid reservoir, a second fluid reservoir, a communication hole, and a lubricating fluid. The sleeve has a bearing hole. The shaft is placed in the bearing hole so as to be relatively rotatable. The hub is fixed to one side in an axial direction of the shaft. The thrust plate or closure plate is fixed to the other side in the axial direction of the sleeve. The radial bearing portion has radial dynamic pressure generating grooves on at least one of an outer peripheral surface of the shaft and an inner peripheral surface of the sleeve. The first fluid reservoir communicates with the radial portion, and is formed between at least two of the sleeve, the shaft, and the thrust plate or closure plate on the other side in the axial direction of the sleeve. The second fluid reservoir communicates with the radial bearing portion, and is formed between the sleeve and the hub. The communication hole is formed in the sleeve and communicates the first and the second fluid reservoirs. The lubricating fluid is held between the sleeve, the shaft, the hub and the thrust plate or closure plate. A capillary pressure is higher in the first fluid reservoir than in the second fluid reservoir.

The hydrodynamic bearing type rotary device according to the third invention is a hydrodynamic bearing type rotary device according to the first or the second invention, in which the capillary pressure is higher in the first fluid reservoir than in the communication hole.

In this case, the capillary force is applied to the lubricating fluid from the communication hole to the first fluid reservoir. Thus, the bubbles can move from the first fluid reservoir to the communication hole easily. Accordingly, it is ensured that the bubbles are discharged from the bearing portion.

The hydrodynamic bearing type rotary device according to the fourth invention comprises a sleeve, a shaft, a seal cap, a thrust plate, a radial bearing portion, a first fluid reservoir, a second fluid reservoir, a communication hole, and a lubricating fluid. The sleeve has a bearing hole. The shaft is placed in the bearing hole so as to be relatively rotatable. The seal cap is fixed to one side in an axial direction of the sleeve. The thrust plate is fixed to the other side in the axial direction of the sleeve. The radial bearing portion has radial dynamic pressure generating grooves on at least one of an outer peripheral surface of the shaft and an inner peripheral surface of the sleeve. The first fluid reservoir communicates with the radial portion, and is formed between at least two of the sleeve, the shaft, and the thrust plate on the other side in the axial direction of the sleeve. The second fluid reservoir communicates with the radial bearing portion, and is formed between the sleeve and the seal cap. The communication hole is formed in the sleeve and communicates the first and the second fluid reservoirs. The lubricating fluid is held between the sleeve, the shaft, the seal cap and the thrust plate. A capillary pressure is higher in the first fluid reservoir than in the communication hole.

In this case, the capillary force is applied to the lubricating fluid from the communication hole to the first fluid reservoir. Thus, the bubbles can move from the first fluid reservoir to the communication hole easily. Accordingly, it is ensured that the bubbles are discharged from the bearing portion.

The hydrodynamic bearing type rotary device according to the fifth invention comprises a sleeve, a shaft, a hub, a thrust plate or closure plate, a radial bearing portion, a first fluid reservoir, a second fluid reservoir, a communication hole, and a lubricating fluid. The sleeve has a bearing hole. The shaft is placed in the bearing hole so as to be relatively rotatable. The hub is fixed to one side in an axial direction of the shaft. The thrust plate or closure plate is fixed to the other side in the axial direction of the sleeve. The radial bearing portion has radial dynamic pressure generating grooves on at least one of an outer peripheral surface of the shaft and an inner peripheral surface of the sleeve. The first fluid reservoir communicates with the radial portion, and is formed between at least two of the sleeve, the shaft, and the thrust plate or closure plate on the other side in the axial direction of the sleeve. The second fluid reservoir communicates with the radial bearing portion, and is formed between the sleeve and the hub. The communication hole is formed in the sleeve and communicates the first and the second fluid reservoirs. The lubricating fluid is held between the sleeve, the shaft, the hub and the thrust plate or closure plate. A capillary pressure is higher in the first fluid reservoir than in the communication hole.

The hydrodynamic bearing type rotary device according to the sixth invention is a hydrodynamic bearing type rotary device according to any one of the first through fifth inventions, in which the capillary pressure is higher in the communication hole than in the second fluid reservoir.

In this case, the capillary force is applied to the lubricating fluid from the second fluid reservoir to the communication hole. Thus, the bubbles can move from the communication hole to the second fluid reservoir easily. Accordingly, it is ensured that the bubbles are discharged from the bearing portion.

The hydrodynamic bearing type rotary device according to the seventh invention comprises a sleeve, a shaft, a seal cap, a thrust plate, a radial bearing portion, a first fluid reservoir, a second fluid reservoir, a communication hole, and a lubricating fluid. The sleeve has a bearing hole. The shaft is placed in the bearing hole so as to be relatively rotatable. The seal cap is fixed to one side in an axial direction of the sleeve. The thrust plate is fixed to the other side in the axial direction of the sleeve. The radial bearing portion has radial dynamic pressure generating grooves on at least one of an outer peripheral surface of the shaft and an inner peripheral surface of the sleeve. The first fluid reservoir communicates with the radial portion, and is formed between at least two of the sleeve, the shaft, and the thrust plate on the other side in the axial direction of the sleeve. The second fluid reservoir communicates with the radial bearing portion, and is formed between the sleeve and the seal cap. The communication hole is formed in the sleeve and communicates the first and the second fluid reservoirs. The lubricating fluid is held between the sleeve, the shaft, the seal cap and the thrust plate. A capillary pressure is higher in the communication hole than in the second fluid reservoir.

In this case, the capillary force is applied to the lubricating fluid from the second fluid reservoir to the communication hole. Thus, the bubbles can move from the communication hole to the second fluid reservoir easily. Accordingly, it is ensured that the bubbles are discharged from the bearing portion.

The hydrodynamic bearing type rotary device according to the eighth invention comprises a sleeve, a shaft, a hub, a thrust plate or closure plate, a radial bearing portion, a first fluid reservoir, a second fluid reservoir, a communication hole, and a lubricating fluid. The sleeve has a bearing hole. The shaft is placed in the bearing hole so as to be relatively rotatable. The hub is fixed to one side in an axial direction of the shaft. The thrust plate or closure plate is fixed to the other side in the axial direction of the sleeve. The radial bearing portion has radial dynamic pressure generating grooves on at least one of an outer peripheral surface of the shaft and an inner peripheral surface of the sleeve. The first fluid reservoir communicates with the radial portion, and is formed between at least two of the sleeve, the shaft, and the thrust plate or closure plate on the other side in the axial direction of the sleeve. The second fluid reservoir communicates with the radial bearing portion, and is formed between the sleeve and the hub. The communication hole is formed in the sleeve and communicates the first and the second fluid reservoirs. The lubricating fluid is held between the sleeve, the shaft, the hub and the thrust plate or closure plate. A capillary pressure is higher in the communication hole than in the second fluid reservoir.

The hydrodynamic bearing type rotary device according to the ninth invention is a hydrodynamic bearing type rotary device according to any one of the first through eighth inventions, in which the capillary pressure $Pn$ [Pa] is represented by the following expression in case that the first or the second chamber has a shape of a thin disc.

$$Fn = 2\pi \times Dn \times \gamma n \times \cos \theta n$$

$$An = \pi \times Dn \times Sn$$

$$Pn = Fn/An$$

$Dn$: Diameter of central position of a connection portion between the communication hole and the fluid reservoir [m]
$\gamma n$: Surface tension of the lubricating fluid [N/m]
$\theta n$: Contact angle of the oil lubricating fluid [rad]
$Sn$: Dimension in the axial direction of the fluid reservoir [m]
$Pn$: The capillary pressure [Pa]

Alternatively, the capillary pressure $Pn$ [Pa] is represented by the following expression in case that the first or the second chamber has a shape of a thin tube.

$$Fno = \pi \times Dno \times \gamma n \times \cos \theta n$$

$$Fni = \pi \times (Dno - 2 \times rn) \times \gamma n \times \cos \theta n$$

$$Fn = Fno + Fni$$

$$An = \pi \times (Dno^2 - Dni^2)/4$$

$$Pn = Fn/An$$

$Dno$: Outer diameter of the fluid reservoir [m]
$rn$: Dimension in the radial direction of the fluid reservoir [m]
$Dni$: Inner diameter of the first chamber ($Dno - 2 \times rn$) [m]
$\gamma n$: Surface tension of the lubricating fluid [N/m]
$\theta n$: Contact angle of the lubricating fluid [rad]
$Pn$: Capillary pressure [Pa]

Herein, the shape of a thin disc means that a dimension in the radial direction of a cross section of the fluid reservoir is larger than a dimension in the axial direction, and a flow of the lubricating fluid in the radial direction is dominant. The shape of a thin tube means that the dimension in the axial direction of a cross section of the fluid reservoir is larger than a dimension in the radial direction, and a flow of the lubricating fluid in the axial direction is dominant. If the dimension in the radial direction and the dimension in the axial direction of a cross section of the fluid reservoir are the same, any of the expressions for the thin disc and the thin tube can be employed. The surface tension $\gamma$ of the lubricating fluid can be obtained by a surface tension measuring method as described in, for example, JIS K2241. The contact angle $\theta$ of the lubricating fluid can be obtained by using a contact angle meter, for example, and measuring the contact angle of a small amount of liquid dripped on a solid.

The hydrodynamic bearing type rotary device according to the tenth invention is a hydrodynamic bearing type rotary device according to any one of the first through ninth inventions, in which the capillary pressure $Pn$ [Pa] is represented by the following expression in case that the connection hole has a cross section of a circular shape.

$$Fn = \pi \times Dn \times \gamma n \times \cos \theta n$$

$$An = \pi \times Dn^2/4$$

$$Pn = Fn/An$$

$Dn$: Diameter of the communication hole [m]
$\gamma n$: Surface tension of the lubricating fluid [N/m]
$\theta n$: Contact angle of the lubricating fluid [rad]
$Pn$: Capillary pressure [Pa]

Alternatively, the capillary pressure $Pn$ [Pa] is represented by the following expression in case that the connection hole has a cross section of a substantially quadrangular shape.

$$Fn = 2 \times (u+t) \times \gamma n \times \cos \theta n$$

$$An = u \times t$$

$$Pn = Fn/An$$

u: Dimension of one side of the communication hole [m]

t: Dimension of the other side of the communication hole [m]

γn: Surface tension of the lubricating fluid [N/m]

θn: Contact angle of the lubricating fluid [rad]

Pn: Capillary pressure [Pa].

The hydrodynamic bearing type rotary device according to the eleventh invention is a hydrodynamic bearing type rotary device according to any one of the first through tenth inventions, in which the communication hole includes a tapered surface formed to have a cross-sectional area which becomes larger toward the adjacent fluid reservoir on at least one end in the axial direction.

In this structure, the lubricating fluid and the bubbles can flow more smoothly.

The hydrodynamic bearing type rotary device according to the twelfth invention is a hydrodynamic bearing type rotary device according to any one of the first through eleventh invention, in which a or the radial dynamic pressure generating grooves have a herringbone pattern asymmetrical in the axial direction so as to flow the lubricating fluid from the radial bearing portion to the communication hole through the first fluid reservoir.

The hydrodynamic bearing type rotary device according to the thirteenth invention is a hydrodynamic bearing type rotary device according to any one of the first through twelfth inventions, in which the dimension in the axial direction of the second fluid reservoir becomes smaller toward the inside in the radial direction.

In this structure, the capillary force is applied to the lubricating fluid in the second fluid reservoir toward the inside in the radial direction having the small dimension in the axial direction. Thus, the bubbles can move toward the outside in the radial direction easily. Accordingly, it is ensured that the bubbles are discharged from the bearing portion.

The hydrodynamic bearing type rotary device according to the fourteenth invention is a hydrodynamic bearing type rotary device according to any one of the first through thirteenth inventions, in which the seal cap includes a tapered portion formed so as to become closer to the sleeve toward the inside in the radial direction.

In this structure, the dimension in the axial direction of the second fluid reservoir becomes small toward the inside the radial direction. Thus, the capillary force is applied to the lubricating fluid in the second fluid reservoir toward the inside in the radial direction having the small dimension in the axial direction. Therefore, the bubbles can move toward the outside in the radial direction easily. Accordingly, it is ensured that the bubbles are discharged from the bearing portion.

The hydrodynamic bearing type rotary device according to the fifteenth invention further comprises a base for fixing the sleeve; a stator to be fixed to the base; a rotor magnet which is positioned so as to oppose the stator, and forms a magnetic circuit with the stator; and a hub for fixing the rotor magnet, which is also fixed to the shaft.

The recording and reproduction apparatus according to the sixteenth invention comprises a hydrodynamic bearing type rotary device according to the fifteenth invention, a disc-shape recording medium fixed to the hub, which can record information; and information access means for writing or reading information to or from a desired position on the recording medium.

In this recording and reproduction apparatus, similar effects as those of the hydrodynamic bearing type rotary device according to the fifteenth invention can be achieved.

In the hydrodynamic bearing type rotary device and the recording and reproduction apparatus according to the present invention, a difference is intentionally provided between the capillary pressures at the respective portions to apply the principle that the lubricating fluid tend to flow to the area with a large capillary pressure, thereby ensuring that the bubbles in the lubricating fluid discharged from the bearing portions.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
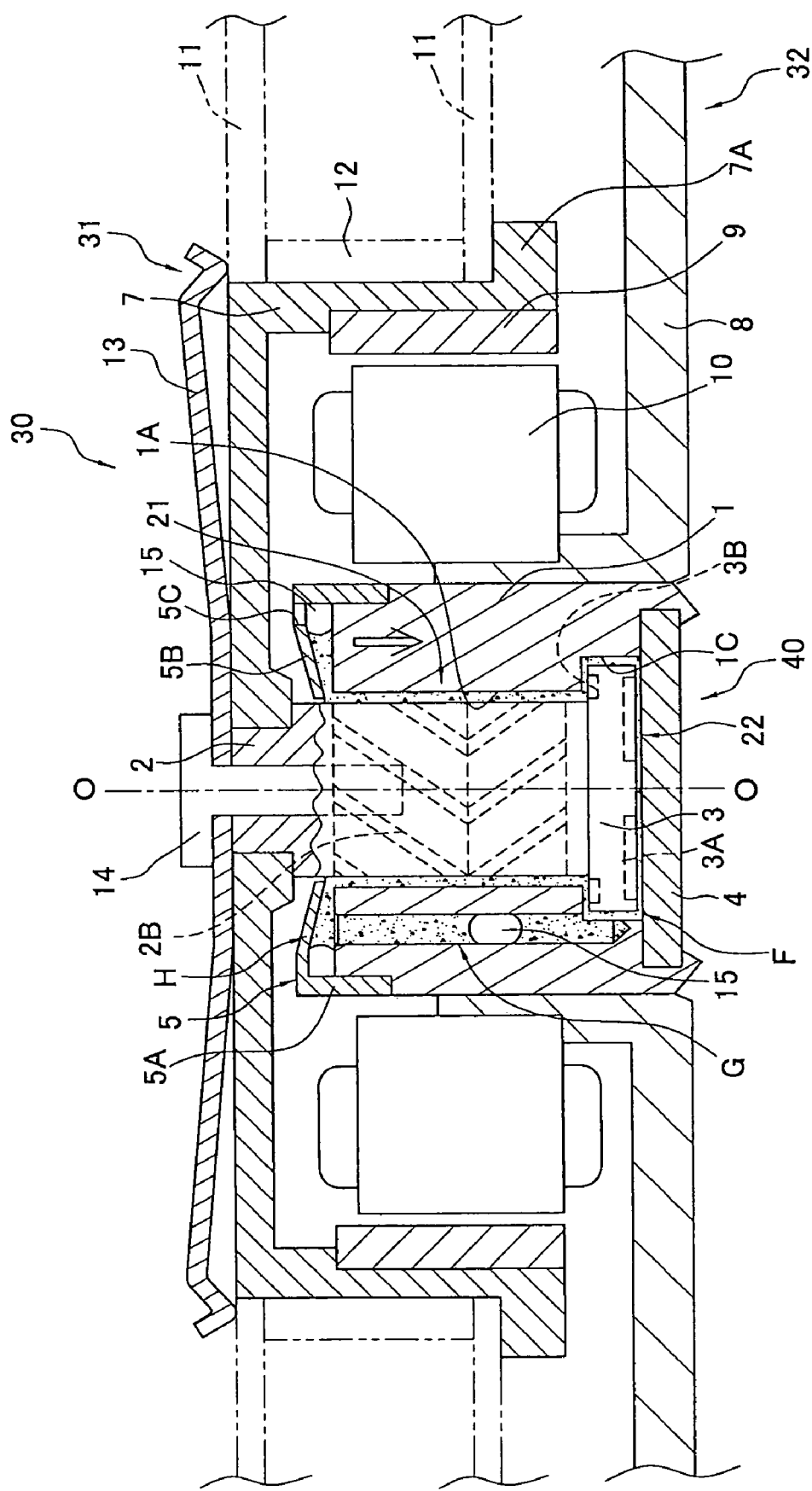
FIG. 1 is a schematic diagram of a vertical cross-section of a hydrodynamic bearing type rotary device according to Embodiment 1 of the present invention.
Figure 2:
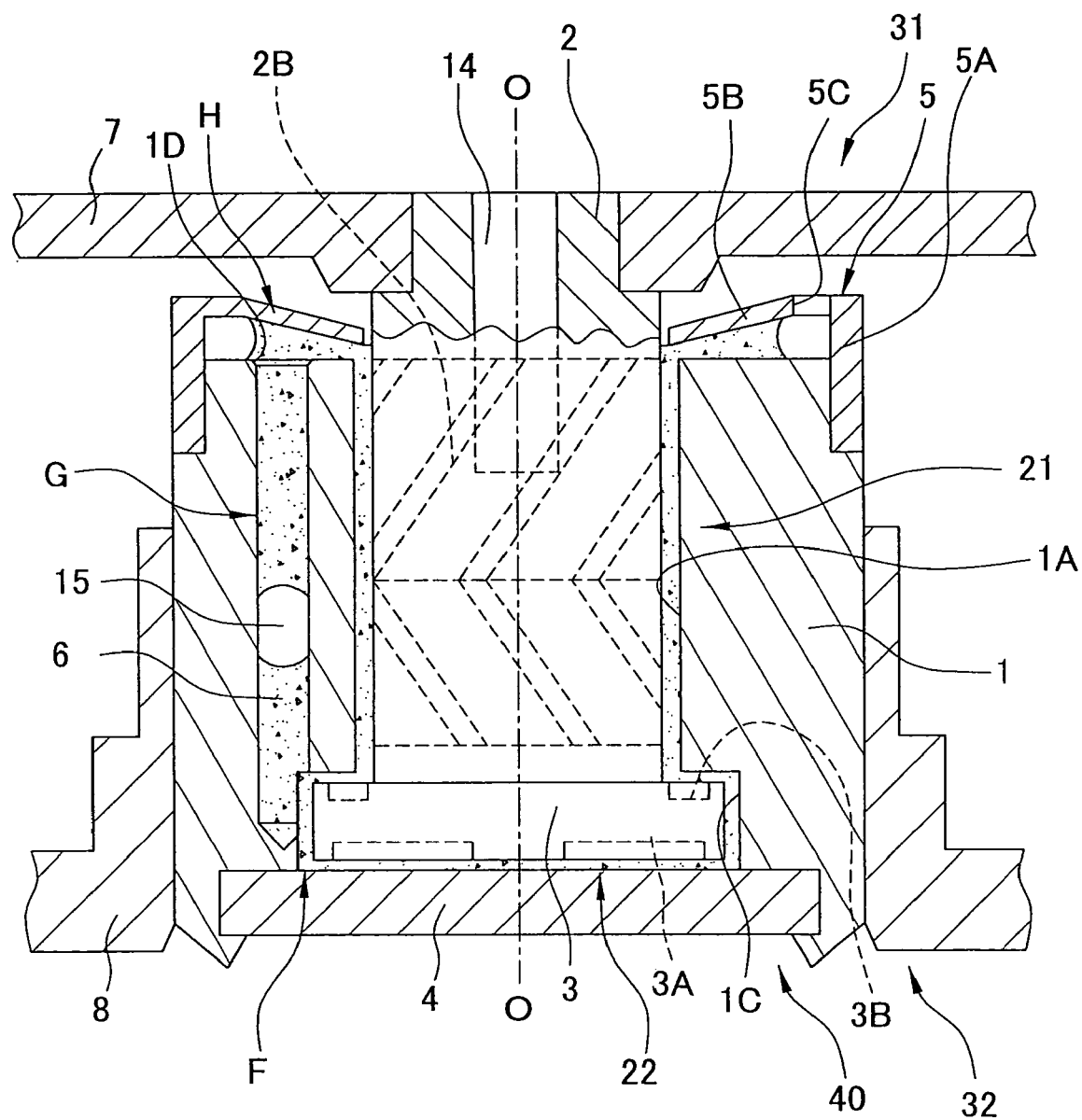
FIG. 2 is a detail cross-sectional view of the hydrodynamic bearing type rotary device.
Figure 3:
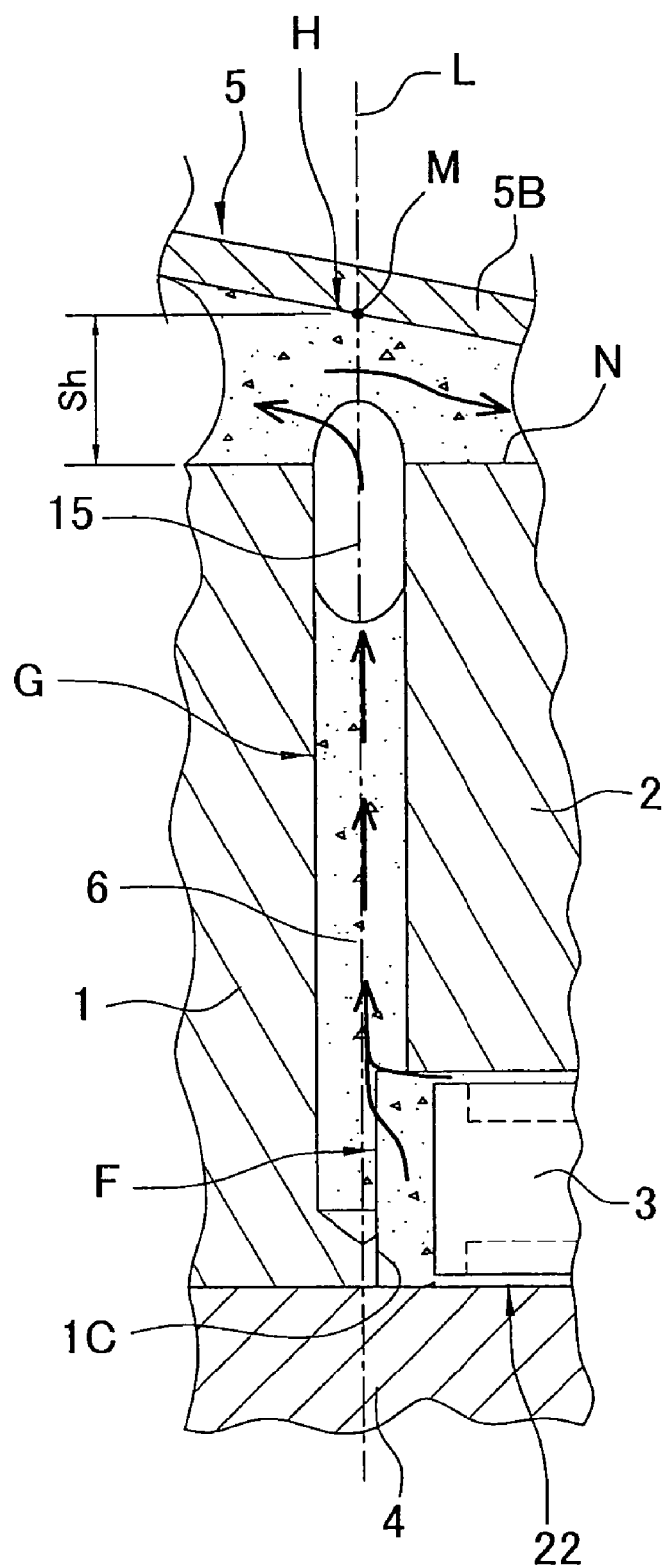
FIG. 3 is a schematic diagram of a vertical cross-section around a communication hole.

With reference to FIGS. 1 through 3, an example of a hydrodynamic bearing type rotary device 30 according to Embodiment 1 of the present invention will be described. Hereinafter, the vertical direction in FIG. 1 is referred to as "axial direction", the upper side is referred to as "upper side in the axial direction" (one side in the axial direction), and the lower side is referred to as "lower side in the axial direction" (the other side in the axial direction). However, these expressions are not intended to limit how the actual hydrodynamic bearing type rotary device 30 is attached.

(1) Entire Structure of the Hydrodynamic Bearing Type Rotary Device 30

FIG. 1 is a schematic diagram of a vertical cross-section of the hydrodynamic bearing type rotary device 30 according to Embodiment 1 of the present invention. The hydrodynamic bearing type rotary device 30 is a device for driving rotation of a recording disc 11, and is mainly formed of a rotating member 31, a stationary member 32, and a hydrodynamic bearing mechanism 40 as shown in FIG. 1.

The rotating member 31 is mainly formed of a hub 7 to which the recording disc 11 is to be attached, and a rotor magnet 9 which forms a magnetic circuit with a stator 10, which will be described below. On an outer periphery of the lower side in the axial direction of the hub 7, a disc placement portion 7A is formed integrally. Two recording discs 11 are fitted to the outer periphery of the hub 7 and placed on the disc placement portion 7A with a circular spacer 12 interposed therebetween. A damper 13 is fixed to the upper side in the axial direction of a shaft 2 with a screw 14. The hub 7 may be fixed to the shaft 2 by press-fitting adhesion, or the two members may be formed integrally. The recording discs 11 are pushed toward the lower side in the axial direction by the damper 13, and are held between the damper 13 and the disc placement section 7A. The rotor magnet 9 is fixed to an inner periphery of the hub 7.

The stationary member 32 is fixed to a housing of the recording disc driving apparatus, which is not shown. The stationary member 32 is mainly formed of a base 8 and a stator 10 fixed to the base 8. In a central portion of the base 8, a hydrodynamic bearing mechanism 40 is fixed. The hydrodynamic bearing mechanism 40 supports the rotating member 31 so as to be rotatable with respect to the stationary member 32.

(2) Structure of the Hydrodynamic Bearing Mechanism 40

FIG. 2 shows schematic diagram of a vertical cross-section around the hydrodynamic bearing mechanism 40, and FIG. 3 shows a schematic diagram of a vertical cross-section around a communication hole.

As shown in FIG. 2, the hydrodynamic bearing mechanism 40 is mainly formed of a sleeve 1, the shaft 2, a flange 3, a thrust plate 4, a seal cap 5, and oil 6 as a lubricating fluid. The sleeve 1, the thrust plate 4, and the seal cap 5 form the stationary member. The shaft 2 and the flange 3 form the rotating member.

The sleeve 1 is a tubular member extending along the axial direction, and is fixed to the base 8 by adhering or the like. On an end on the lower side in the axial direction of the sleeve 1, the thrust plate 4 is fixed. A bearing hole 1A is formed by the sleeve 1 and the thrust plate 4.

The shaft 2 is a pillar member extending along the axial direction, and supports the hub 7 so as to be rotatable. Specifically, the shaft 2 is located on an inner peripheral side of the sleeve 1 so as to be relatively rotatable with a gap being interposed therebetween. On an end on the upper side in the axial direction of the shaft 2, the hub 7 is fixed. On an outer peripheral surface of the shaft 2, a plurality of radial dynamic pressure generating grooves 2B are formed. A radial bearing portion 21 having the radial dynamic pressure generating grooves 2B is formed between the sleeve 1 and the shaft 2. The radial dynamic pressure generating grooves 2B have a herringbone pattern which is asymmetrical in the axial direction, for example. By a supporting pressure generated at the radial bearing portion 21, the shaft 2 and the rotating member 31 are supported in a radial direction.

The flange 3 is a member of a disc shape, and is fixed to the end on the lower side in the axial direction of the shaft 2. On surfaces on the upper side and the lower side in the axial direction of the flange 3, a plurality of thrust dynamic pressure generating grooves 3A and 3B are formed. A thrust bearing portion 22 having the thrust dynamic pressure generating grooves 3A and 3B is formed between the flange 3, the sleeve 1 and the thrust plate 4. The thrust dynamic pressure generating grooves 3A and 3B have a spiral pattern, for example. By a supporting pressure generated at the thrust bearing portion 22, the shaft 2 and the rotating member 31 are supported in the axial direction. The shaft 2 and the flange 3 may be formed integrally. Further, the thrust dynamic pressure generating grooves 3A and 3B may have a herringbone pattern.

A circular recessed portion 1C is formed on the end of the lower side in the axial direction of the sleeve 1. An outer periphery of the flange 3 is accommodated between the recessed portion 1C and the thrust plate 4. Between the recessed portion 1C of the sleeve 1, the flange 3, and the thrust plate 4, a first fluid reservoir F is formed. As shown in FIG. 3, the first fluid reservoir F is a space having a shape of thin tube, which is formed between the recessed portion 1C and the flange 3 in the radial direction.

On the end on the upper side in the axial direction of the sleeve 1, the seal cap 5 is fixed. The seal cap 5 is a circular member, and has a tubular fixed portion 5A fixed to the sleeve 1, a tapered portion 5B extending from an end of the fixed portion 5A in the axial direction toward the inside in the radial direction, and a vent hole 5C which is formed on the outer periphery of the tapered portion 5B. For providing a gas-liquid separation function, the tapered portion 5B has at least the inner surface on the sleeve 1 side inclined downward in the axial direction from the outside in the radial direction toward the inside. The tapered portion 5B has an inner diameter substantially same as that of the sleeve 1, and is located with a gap from the outer periphery of the shaft 2. Between the seal cap 5 and the sleeve 1, a second fluid reservoir H is formed. An inner periphery of the second fluid reservoir H communicates with the radial bearing portion 21. The dimension of the second fluid reservoir H in the axial direction becomes small toward the inside in the radial direction.

In the sleeve 1, a communication hole G is formed. Specifically, as shown in FIGS. 2 and 3, the communication hole G is a hole extending along the axial direction, and the first fluid reservoir F and the second fluid reservoir H communicate with one another through the communication hole G. An end on the upper side in the axial direction of the communication hole G penetrates the sleeve 1 in the axial direction, and communicates with the second fluid reservoir H. An end on the lower side in the axial direction of the communication hole G is located near the recessed portion 1C, and communicates with the first fluid reservoir F. As shown in FIG. 3, the communication hole G extends to a portion around the central position of the first fluid reservoir F in the axial direction, and a central axis of the communication hole G is positioned outside the outer diameter of the first fluid reservoir F in the radial direction. In the present embodiment, a cross section of the communication hole G cut along a plane vertical to the axial direction has a circular shape, and the sleeve 1 may include a tapered surface 1D treated with a chamfering process on the upper side in the axial direction of the communication hole G. The tapered surface 1D is formed such that the cross-sectional area becomes larger toward the adjacent second fluid reservoir H. The tapered surface 1D allows the oil 6 and bubbles 15 to flow more smoothly. A plurality of the communication holes G may be provided in a circumferential direction. The tapered surface 1D may be provided on both ends of the communication hole G.

The oil 6 is filled in the radial bearing portion 21, the thrust bearing portion 22, the first fluid reservoir F, the communication hole G, and the second fluid reservoir H. The oil 6 may be, for example, an ester oil having a low viscosity. The sleeve 1 is formed of, for example, pure iron, stainless steel, copper alloy, sintered metal, or the like. The shaft 2 is formed of, for example, stainless steel or the like. Reference numeral 15 shown in FIGS. 1 through 3 denotes bubbles (air) in the oil 6.

(3) Operation of the Hydrodynamic Bearing Type Rotary Device 30

Hereinafter, an operation of the hydrodynamic bearing type rotary device 30 will be described.

In the hydrodynamic bearing type rotary device 30, a rotational magnetic field is generated when a current flows through the stator 10, and a rotational force is applied to the rotor magnet 9. Thus, the rotating member 31 starts to rotate with the shaft 2. When the shaft 2 rotates, supporting pressures in the radial direction and the axial direction are generated in the dynamic pressure generating grooves 2B, 3A, and 3B. Thus, the shaft 2 is supported without contact with the sleeve 1. This means that the rotating member 31 is rotatable with respect to the stationary member 32 in a non-contact state. In this way, a high-speed rotation of the recording disc 11 with a high precision is realized.

(4) Behavior of Bubbles

Hereinafter, the behavior of the bubbles 15 in the oil 6 will be described in detail with reference to FIGS. 3 through 7.

When the shaft 2 rotates, the dynamic pressure generating grooves 2B, 3A, and 3B gather up the oil 6 around them. As a result, as shown in FIG. 3, pumping pressures are generated respectively between the shaft 2 and the sleeve 1, and between the flange 3, the sleeve 1, and the thrust plate 4. The oil 6 is pushed toward the lower side in the axial direction in the radial bearing portion 21, and toward the outside in the radial direction in the thrust bearing portion 22. The oil 6 is moved to the second fluid reservoir H through the first fluid reservoir F and the communication hole G, and circulates back to the radial bearing portion 21 from the inner periphery of the second fluid reservoir H.

In this way, in the hydrodynamic bearing type rotary device 30, the bubbles 15 of the radial bearing portion 21 and the thrust bearing portion 22 are discharged by a circulating function of the oil 6 as the high-speed rotation with a high precision is realized.

However, in actual cases, the behavior of the oil 6 and the bubbles 15 vary depending upon conditions such as dimensions of the first fluid reservoir F, the communication hole G and the second fluid reservoir H, and the like. Sometimes, it may happen that the oil 6 is circulating but the bubbles 15 are not discharged. This is because the relationship in the magnitude among the capillary pressures at the respective portions varies depending upon conditions such as dimensions of the spaces between the respective portions and the like. The relationship between the capillary pressures at the respective portions and the behavior of the bubbles is confirmed by visual observation in various experimentations. The behavior of the bubbles in the lubricating fluid is a replacement phenomenon between the lubricating fluid and the bubbles. The present inventors found that the replacement phenomenon cannot be explained only by the dimensions, shapes of the spaces of the respective portions of the fluid reservoirs or the vent holes, and it can be explained only when the capillary pressures are taken into consideration.

As used herein, the capillary pressure refers to a pressure difference generated between two types of fluids which are insoluble to each other (or hardly dissolve in each other) when they touch a surface of a solid due to a difference in their properties to wet the solid surface (wettability). The capillary pressure is determined by mainly, a surface tension and/or a contact angle of the fluid, a shape and material of a portion in which the fluid is filled, surface roughness, and the like. How to set the capillary pressure will be described later in detail.

Figure 4A:
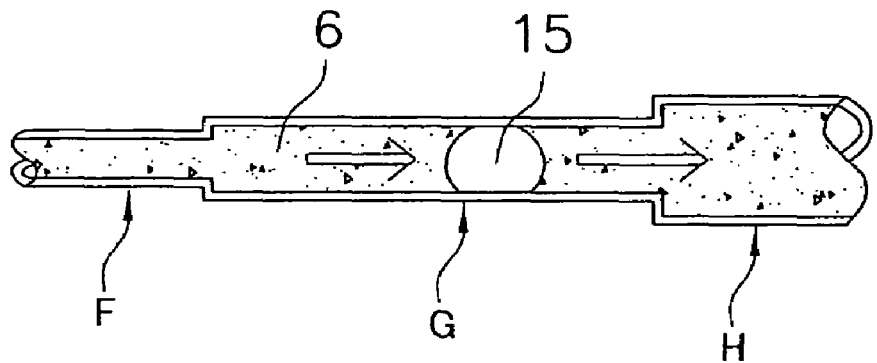
FIG. 4A is a schematic diagram around the communication hole.
Figure 4B:
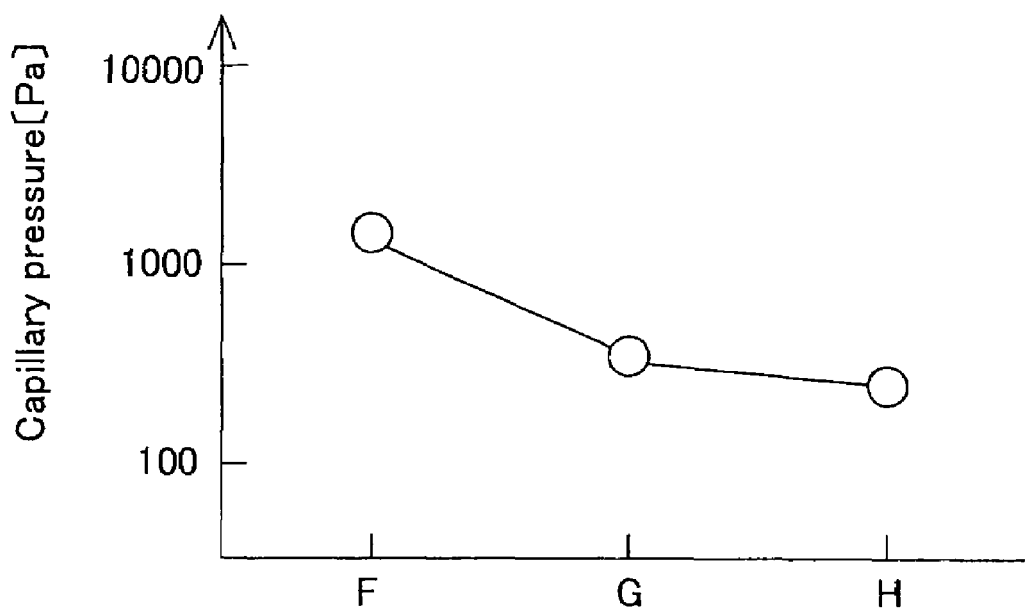
FIG. 4B is a diagram showing actual capillary pressures.
Figure 5A:
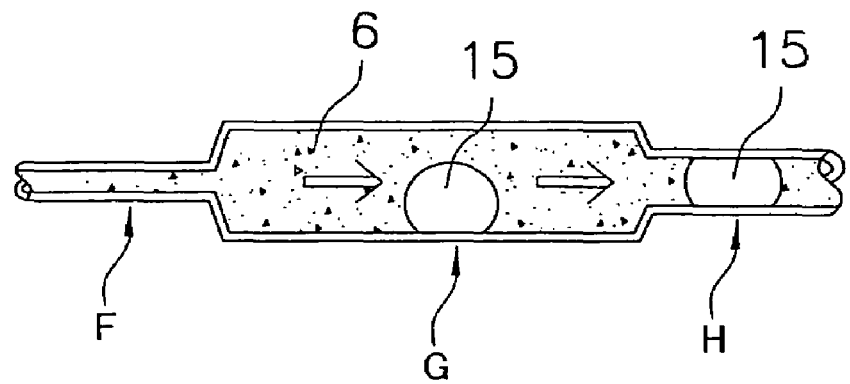
FIG. 5A is a schematic diagram around the communication hole.
Figure 5B:
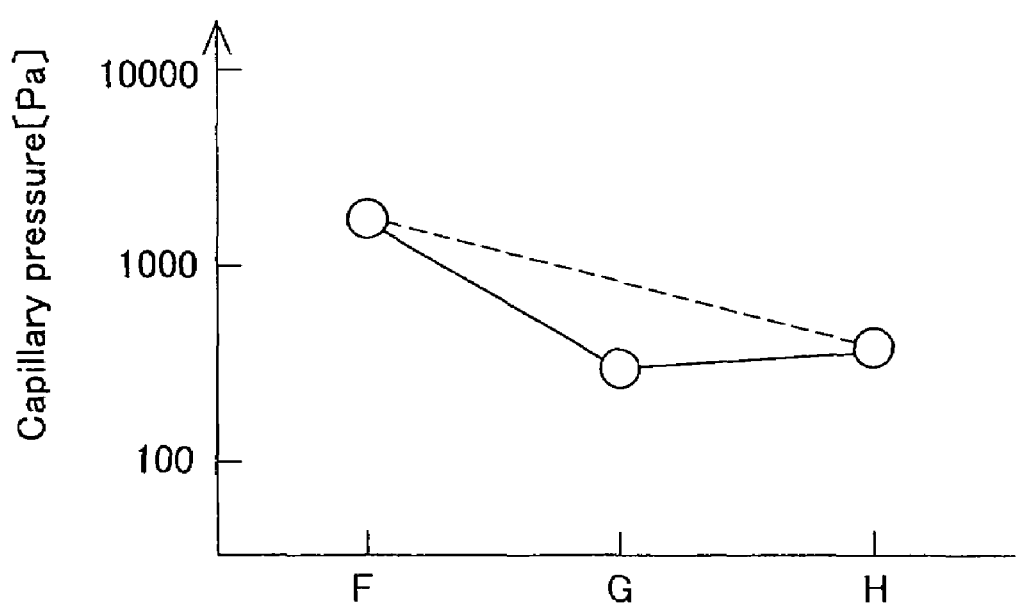
FIG. 5B is a diagram showing actual capillary pressures.

The details of the experiment conducted for confirming the above principle will be described briefly. In the experiment, the behavior of the bubbles was confirmed by visual observation with the condition of the capillary pressure being varied. FIGS. 4A and 5A are schematic diagrams around the communication hole G. FIGS. 4B and 5B show actual capillary pressures at the respective portions. In FIGS. 4A and 5A, the first fluid reservoir F, the communication hole G, and the second fluid reservoir H are respectively shown as a fluid channel having a cross section of a circular shape. The larger the inner diameter becomes, the smaller the capillary pressure is. When the capillary pressures of the first fluid reservoir F, the communication hole G, and the second fluid reservoir H are respectively Pf, Pg, Ph [Pa], the relationship between the capillary pressures at the respective portions under the condition shown in FIGS. 4A and 4B satisfies following Expression (1).

$$Pf > Pg > Ph \ldots \quad (1)$$

Due to the circulating function by the pumping pressure of the radial dynamic pressure generating grooves, the oil 6 basically flows from the first fluid reservoir F to the second fluid reservoir H. However, under this condition, the oil 6 tends to flow from the second fluid reservoir H to the communication hole G, and from the communication hole G to the first fluid reservoir F. This phenomenon occurs because the oil 6 and the bubble 15 are trying to replace each other. As a result, the bubble 15 flows from the first fluid reservoir F through communication hole G to the second fluid reservoir H in the direction opposite to the flow of the oil 6. The same thing happens even when there is no flow of the oil 6 by the circulating function. However, the flow of the oil 6 by the circulating function makes it easier for the bubble 15 to flow from the first fluid reservoir F to the second fluid reservoir H.

The relationship between the capillary pressures at the respective portions under the condition shown in FIGS. 5A and 5B satisfies following Expression (2).

$$Pf > Ph > Pg \ldots \quad (2)$$

Under such condition, it is difficult for the oil 6 to flow from the second fluid reservoir H to the communication hole G, but it is easy for the oil 6 to flow from the communication hole G to the first fluid reservoir F. In this example, the oil 6 tends to flow from the second fluid reservoir H to the first fluid reservoir F. The bubble 15 tends to flow from the first fluid reservoir F through the communication hole G to the second fluid reservoir H in the direction opposite to the flow of the oil 6. This phenomenon occurs because the oil 6 and the bubble 15 try to replace each other.

As described above, by intentionally providing a difference in the capillary pressures between the two adjacent areas, the flow of the fluid and the bubbles between these areas can be made smooth. Similar effects can be achieved based on two different expressions, Expressions (1) and (2). Therefore, not only when two areas are adjacent but also when two areas communicate with each other with another area interposed therebetween, the flow of the fluid and bubbles can be made smooth by intentionally providing a difference in the capillary pressures at the two separated areas. Specifically, as long as at least one of Pf>Pg, Pg>Ph, and Pf>Ph is satisfied, the similar effects can be obtained. The effect is the largest when the relationship of Expression (1) is satisfied. When the above-described principle is applied to the hydrodynamic bearing type rotary device, it becomes possible to ensure discharge of bubbles from the bearing portions.

(5) Capillary Pressure

Figure 6:
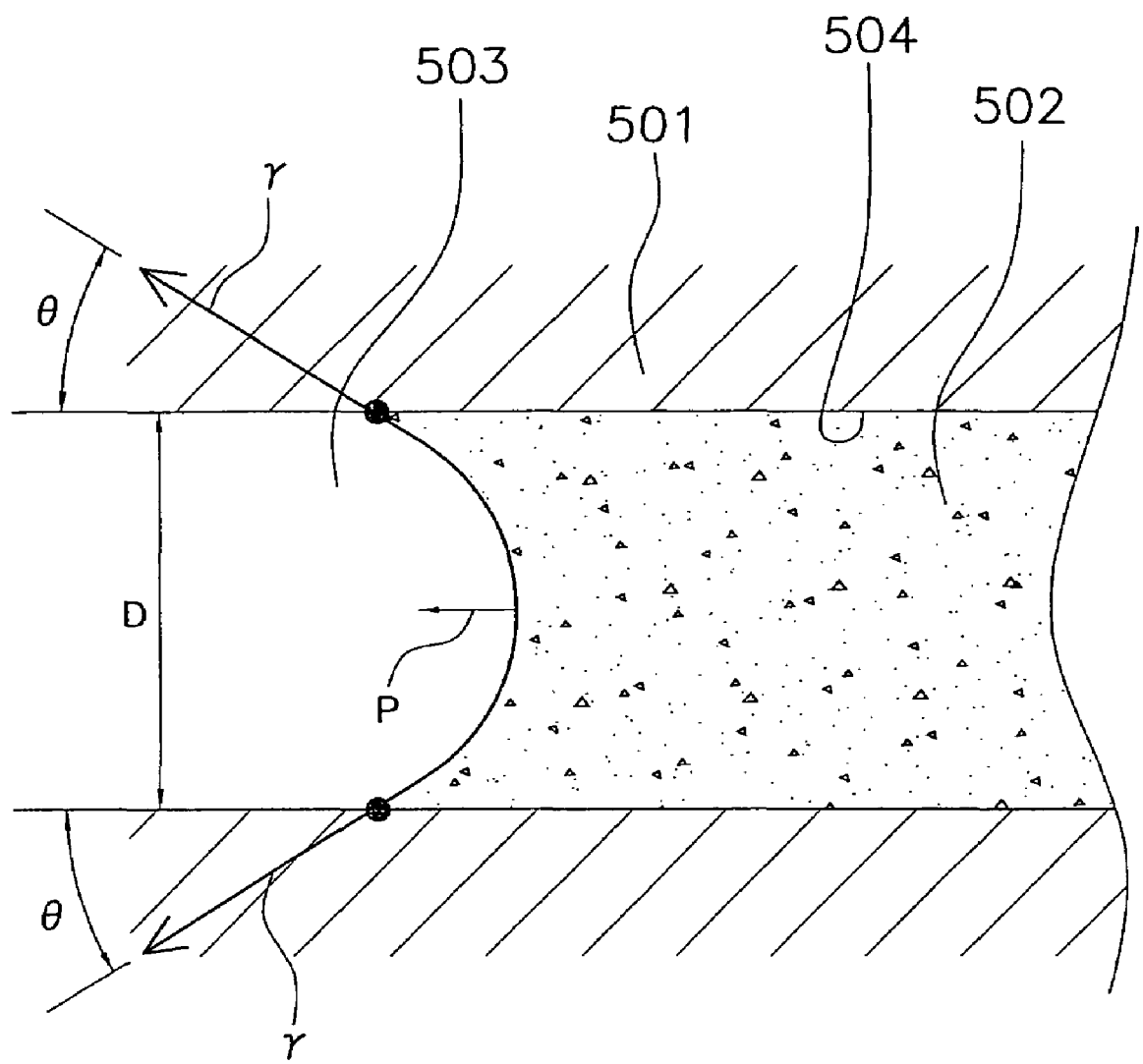
FIG. 6 is a diagram illustrating a basic model for capillary pressures.

Next, specific methods for calculating the capillary pressures will be described. Before describing specific calculation models, a basic model of capillary pressures will be described. FIG. 6 is a diagram illustrating the basic model of the capillary pressures.

As shown in FIG. 6, in the basic model, oil 502 is filled in a space 504 within a member 501, and there is a bubble 503 in the oil 502. The space 504 is a tubular space having an inner diameter of D [m]. In this example, the surface tension of the oil 502 is larger than that of the bubble 503. Thus, surface tension γ [N/m] is applied to a contact portion between the oil 502 and the member 501, and the oil 502 and the member 501 contact each other with contact angle θ [rad] being maintained. The surface tension γ is directed toward the contact angle θ.

In this basic model, since the space 504 has a tubular shape, the capillary force P [Pa] which is a pressure difference between the oil 502 and the bubble 503 can be represented by following Expression (3).

$$F = \pi \times D \times \gamma \times \cos\theta \quad (3)$$
$$A = \pi \times D^2 / 4$$
$$P = F/A$$
$$= 4 \times \gamma \times \cos\theta / D$$

F: Force in a horizontal direction applied to the oil 502 [N]
A: Cross-sectional area of the space 504 [m$^2$]

As is clear from Expression (3), the capillary pressure P is a function of the surface tension γ, the contact angle θ, and the inner diameter D. The surface tension γ of the lubricating fluid can be obtained by a surface tension measuring method as described in, for example, JIS K2241. The contact angle θ of the lubricating fluid can be obtained by using a contact angle meter, for example, and measuring the contact angle of a small amount of liquid dripped on a solid. Specifically, for example, the surface tension γ at room temperature is γ≅0.0028 [N/m] in case that the lubricating is ester oil. In case that the lubricating fluid is an ether, γ≅0.00169 [N/m]. In case that the lubricating fluid is an ionic liquid, γ≅0.00380 [N/m].

Figure 7:
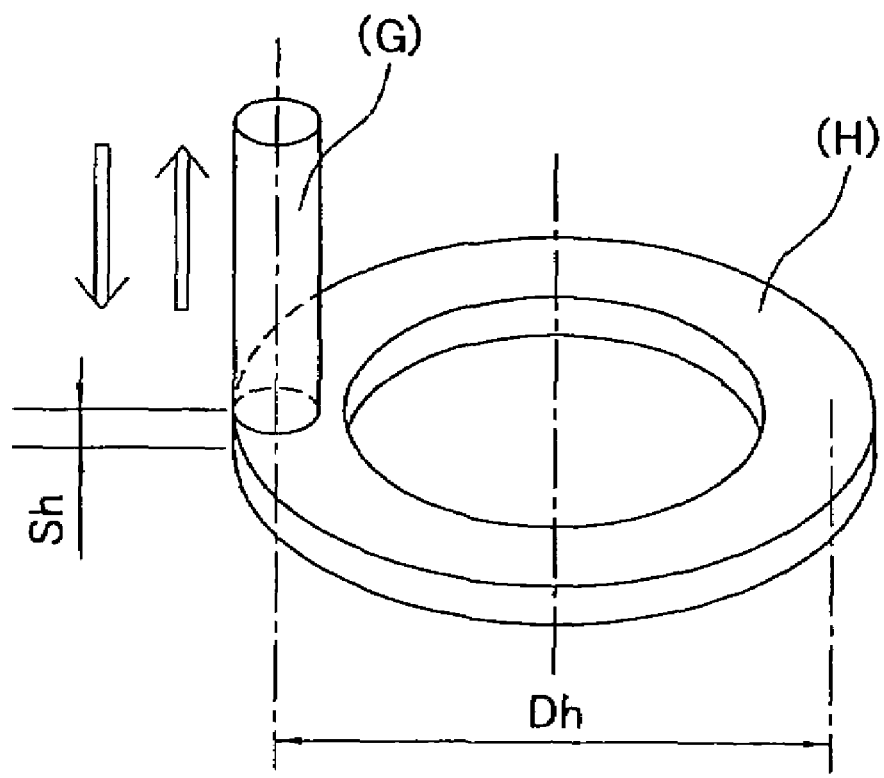
FIG. 7 is a diagram illustrating Calculation Model 1.
Figure 8:
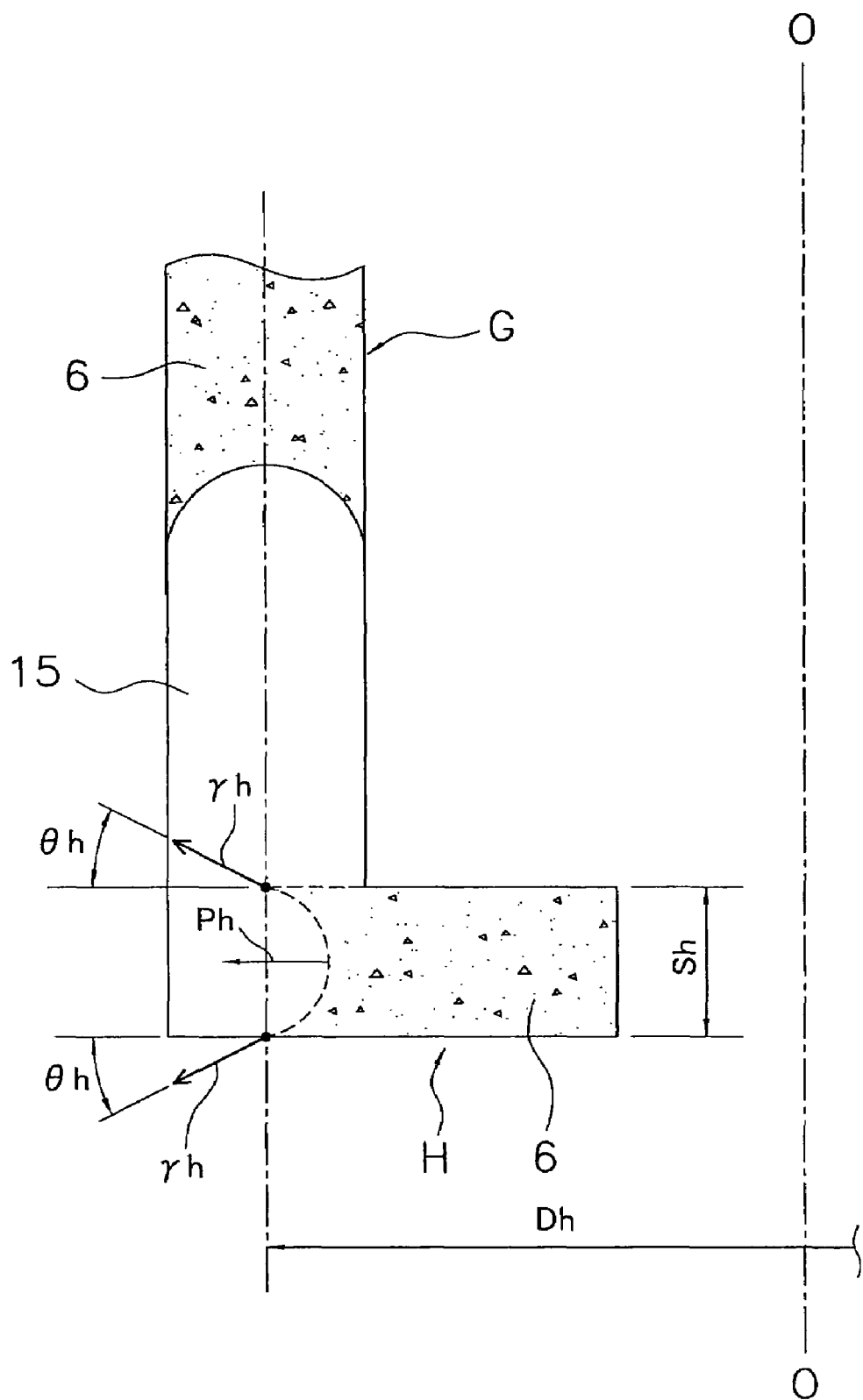
FIG. 8 is a cross sectional view along a plane including a rotation center of Calculation Model 1.
Figure 9:
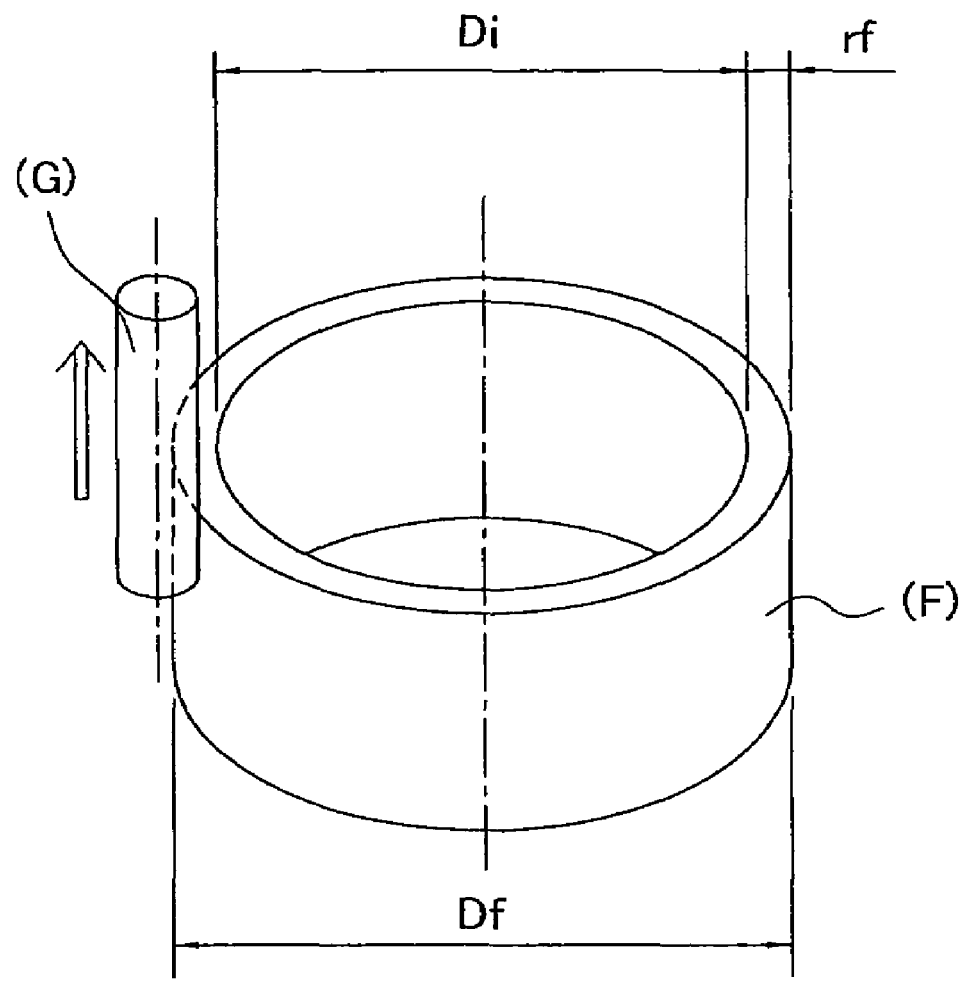
FIG. 9 is a diagram illustrating Calculation Model 2.
Figure 10:
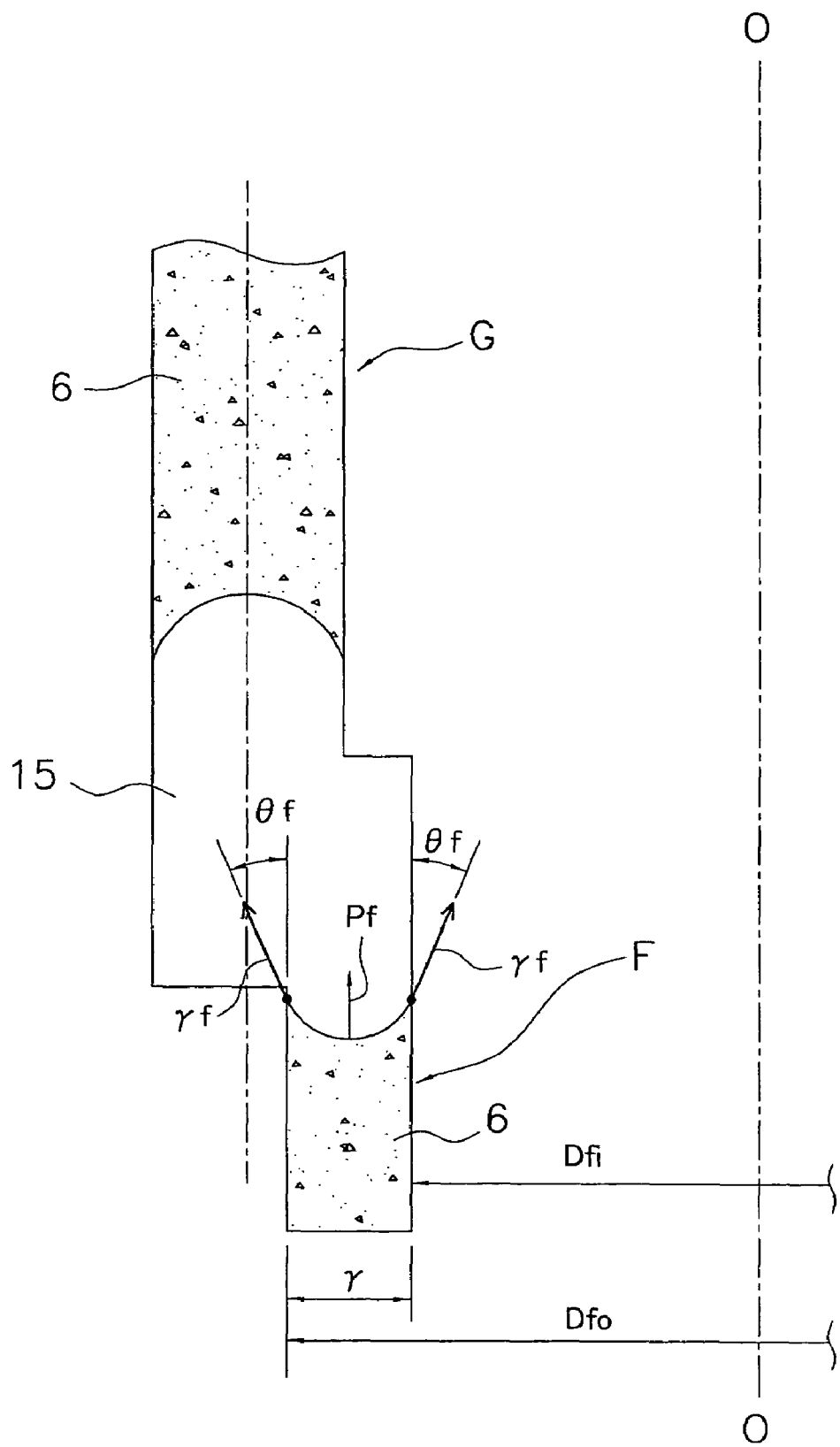
FIG. 10 is a cross sectional view along a plane including a rotation center of Calculation Model 2.
Figure 11:
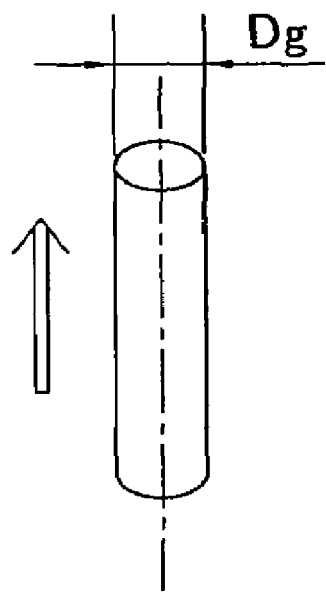
FIG. 11 is a diagram illustrating Calculation Model 3.
Figure 12:
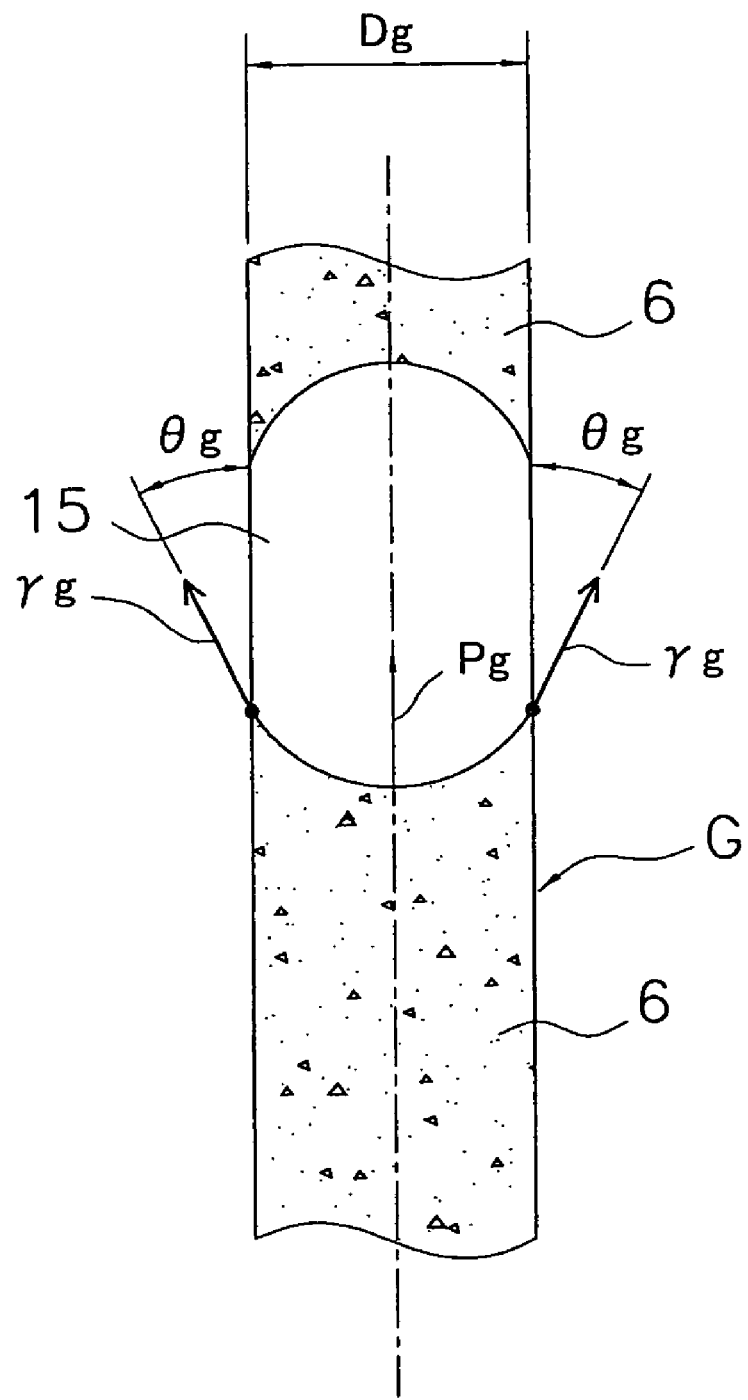
FIG. 12 is a cross sectional view along a plane including a rotation center of Calculation Model 3.
Figure 13:
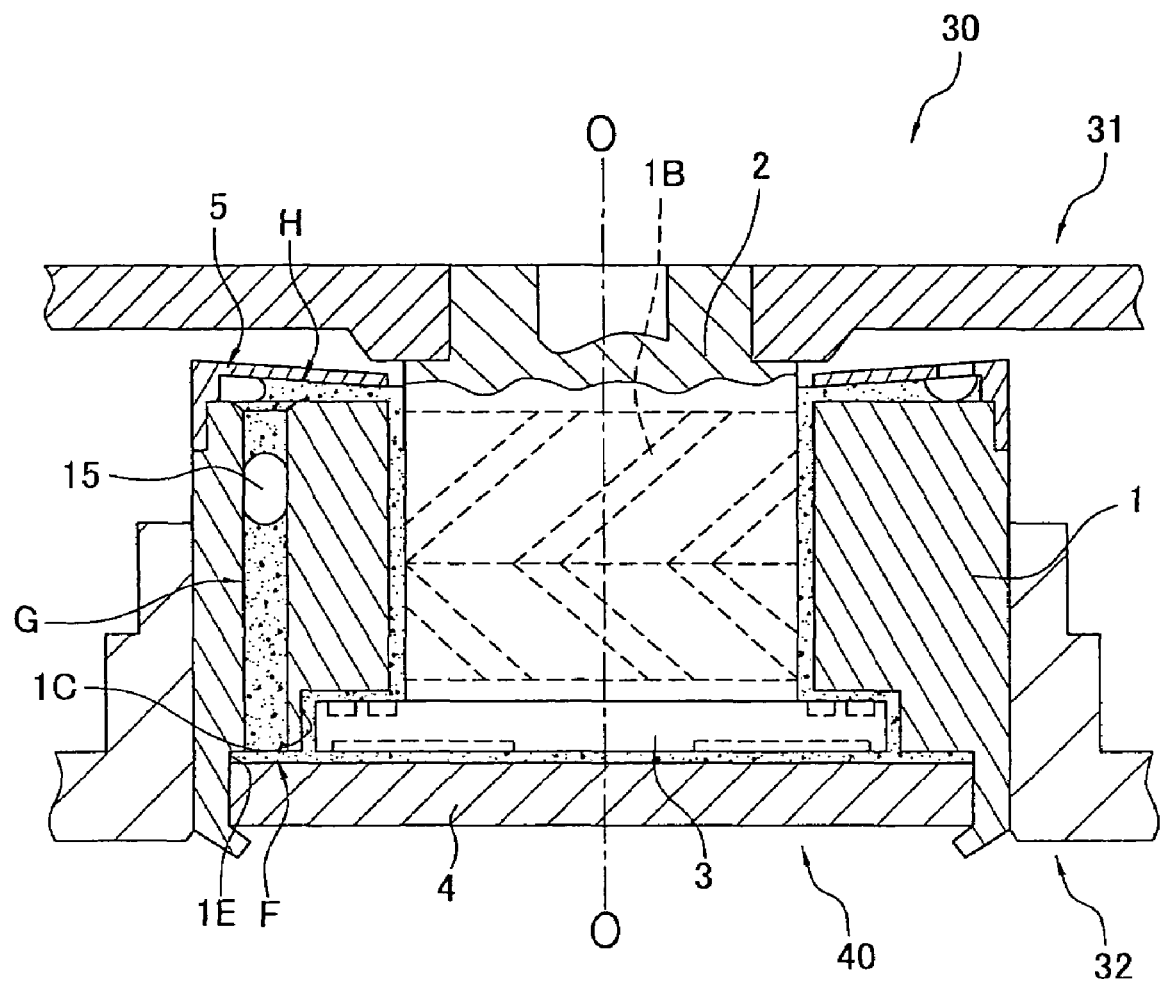
FIG. 13 is a schematic diagram of a vertical cross-section of a hydrodynamic bearing type rotary device according to a variation of Embodiment 1 of the present invention.
Figure 14:
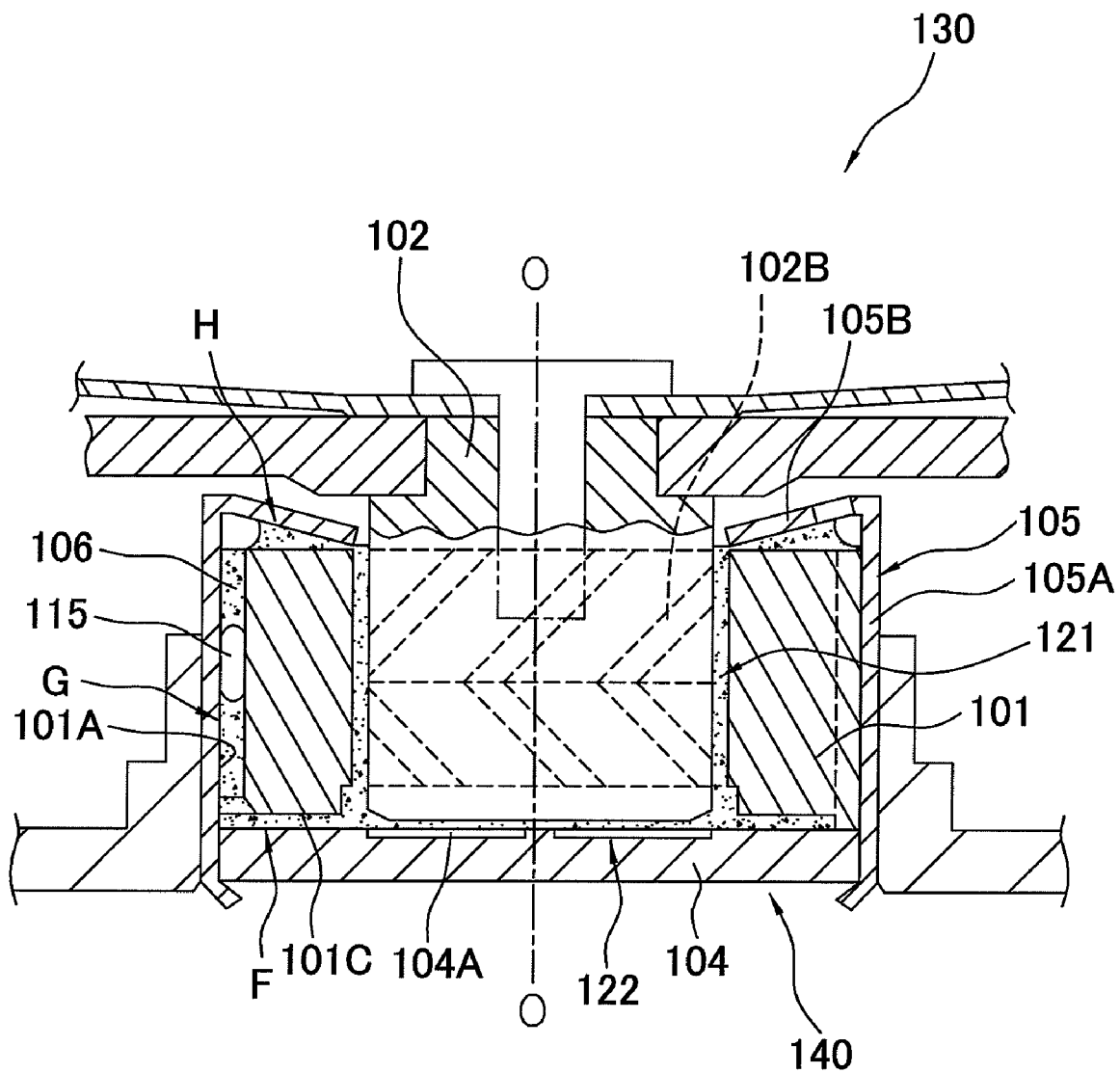
FIG. 14 is a schematic diagram of a vertical cross-section of a hydrodynamic bearing type rotary device according to Embodiment 2 of the present invention.

Next, examples of calculation models obtained by applying the idea of the basic model to the first fluid reservoir F, the communication hole G, and the second fluid reservoir H of the hydrodynamic bearing type rotary device 30 shown in FIG. 1 will be described with reference to FIGS. 7 through 10. FIGS. 7 and 8 illustrate Calculation Model 1. FIGS. 9 and 10 illustrate Calculation Model 2. FIGS. 11 and 12 illustrate Calculation Model 3. FIGS. 13 and 14 illustrate Calculation Model 4.

1) Calculation Model 1

As shown in FIG. 7, in Calculation Model 1, it is assumed that a communication hole is connected to a space having a shape of a thin disc as the second fluid reservoir H. FIG. 7 shows spaces of the communication hole G and the second fluid reservoir H. When the basic model described above is applied to Calculation Model 1 shown in FIG. 7, the model shown in FIG. 8 is obtained. FIG. 8 is a cross-sectional view of Calculation Model 1. In this case, capillary pressure Ph [Pa] at the second fluid reservoir H, for example, is represented by following Expression (4).

$$Fh = 2\pi \times Dh \times \gamma h \times \cos\theta h \quad (4)$$
$$Ah = \pi \times Dh \times Sh$$
$$Ph = Fh/Ah$$
$$= 2 \times \gamma h \times \cos\theta h / Sh$$

Dh: Diameter at central position of a connection portion between the communication hole G and the second fluid reservoir H [m]
γh: Surface tension of the oil 6 [N/m]
θh: Contact angle of the oil 6 [rad]
Sh: Dimension in the axial direction of the second fluid reservoir H [m]
Ph: Capillary pressure [Pa]

Specifically, for example, in case of Dh=0.0033 [m], Sh=0.00007 [m], γh=0.00288 [N/m], and θh=0.2269 [rad], Ph=802 [Pa]. Further, in case of Dh=0.0036 [m] and Sh=0.000035 [m], Ph=1604 [Pa].

Actually, the second fluid reservoir H does not have a shape of a thin disc, and the dimension in the axial direction of the second fluid reservoir H becomes smaller toward the inside in the radial direction as shown in FIG. 2. In this case, as shown in FIG. 3, the dimension Sh is a length in the axial direction from a contact point M between the central axis L of the communication hole G with the tapered portion 5B to an end surface N in the axial direction of the sleeve 1.

2) Calculation Model 2

As shown in FIG. 9, in Calculation Model 2, it is assumed that a communication hole is connected to a space of a shape of a thin disc as the first fluid reservoir F. FIG. 9 shows spaces of the first fluid reservoir F and the communication hole G. When the basic model described above is applied to Calculation Model 2 shown in FIG. 9, the model shown in FIG. 10 is obtained. FIG. 10 is a cross-sectional view of Calculation Model 2. In this case., capillary pressure Pf [Pa] at the first fluid reservoir F, for example, is represented by following Expression (5).

$$Ffo = \pi \times Dfo \times \gamma f \times \cos\theta f \quad (5)$$
$$Ffi = \pi \times (Dfo - 2 \times rf) \times \gamma f \times \cos\theta f$$

-continued $$Ff = Ffo + Ffi$$

$$Af = \pi \times (Dfo^2 - Dfi^2)/4$$

$$Pf = Ff/Af$$
$$= 2 \times \gamma f \times \cos\theta f / rf$$

Dfo: Outer diameter of the first fluid reservoir F [m]
rf: Dimension in the radial direction of the first fluid reservoir F [m]
Dfi: Inner diameter of the first fluid reservoir F (Dfo−2×rf) [m]
γf: Surface tension of the oil 6 [F/m]
θf: Contact angle of the oil 6 [rad]
Pf: Capillary pressure [Pa]

Specifically, for example, in case of Df=0.002436 [m], rf=0.00005 [m], Pf=0.00005 [m], γf=0.0288 [N/m], and θf=0.2269 [rad], Pf=1122 [Pa].

3) Calculation Model 3

As shown in FIG. 11, in Calculation Model 3, a space having a cross section of a circular shape as the communication hole G is considered. FIG. 11 shows a space of the communication hole G. When the basic model described above is applied to Calculation Model 3 shown in FIG. 11, the model shown in FIG. 12 is obtained. FIG. 12 is a cross-sectional view of Calculation Model 3. In this case, capillary pressure Pg [Pa] at the communication hole G, for example, is represented by following Expression (6).

$$Fg = \pi \times Dg \times \gamma g \times \cos\theta g \qquad (6)$$

$$Ag = \pi \times Dg^2 / 4$$

$$Pg = Fg/Ag$$
$$= 4 \times \gamma g \times \cos\theta g / Dg$$

Dg: Diameter of the communication hole G [m]
γg: Surface tension of the oil 6 [N/m]
θg: Contact angle of the oil 6 [rad]
Pg: Capillary pressure [Pa]

Specifically, for example, in case of Dg=0.0002 [m], γ=0.00288 [N/m], and θ=0.2269 [rad], P=561 [Pa].

As described above, in the hydrodynamic bearing type rotary device, an effect of discharging the bubbles 15 cannot be realized by simply adjusting dimensions of the components such as size of the spaces and the like. The effect of discharging the bubbles 15 can be achieved only when the device is manufactured with differences in the capillary pressures are taken into consideration.

Based on Expressions (4) through (6) derived from Calculation Models 1 through 3, capillary pressures at the first fluid reservoir F, the communication hole G, and the second fluid reservoir H are calculated. Then, materials, dimensions, surface roughness of the components, the type of the lubricating fluid and the like are determined such that the capillary pressures satisfy the relationship of Expressions (1) or (2). As a result, in the hydrodynamic bearing type rotary device 30, the bubbles 15 can flow from the first fluid reservoir F to the second fluid reservoir H through the communication hole G more easily, and it is ensured that the bubbles 15 are discharged from the radial bearing portion 21 and the thrust bearing portion 22. Particularly, when the device is designed to satisfy the relationship of Expression (1), the hydrodynamic bearing type rotary device with the smoothest flow of the bubbles 15 and with the highest discharging effects of the bubbles 15 can be obtained.

Further, in the hydrodynamic bearing type rotary device 30, the seal cap 5 includes the tapered portion 5B. Thus, the oil 6 flow toward the inner periphery in the second fluid reservoir H, and the bubbles 15 are gathered to the outer periphery (gas-liquid separation function). This further ensures the discharge of the bubbles 15 from the bearing portion. Even when the tapered portion 5B is not provided, the discharging effect of the bubbles 15 utilizing the differences in the capillary pressures as described above can be achieved.

(6) Variation

A variation for the hydrodynamic bearing type rotary device 30 is shown in FIG. 13. The hydrodynamic bearing type rotary device 30 has a structure around the first fluid reservoir F which is different from that in the above embodiment. Specifically, the sleeve 1 includes a second recessed portion 1E outside the recessed portion 1C, and the first fluid reservoir F, which is a space of a circular shape, is formed between the second recessed portion 1E and the thrust plate 4. The communication hole G is connected to the first fluid reservoir F, and does not communicate with the recessed portion 1C.

In this example, above Calculation Model 1 can be applied to capillary pressures Pf and Ph [Pa] at the first fluid reservoir F and the second fluid reservoir H, and the capillary pressures Pf and Ph can be represented by above Expression (4). Further, to the capillary pressure Pf [Pa] of the first fluid reservoir F, above Calculation Model 2 can be applied, and the capillary pressure Pf can be represented by above Expression (5).

Alternate Embodiments

Alternate embodiments will now be explained. In view of the similarity between the first and alternate embodiments, the parts of the alternate embodiment that are identical to the parts of the first embodiment will be given the same reference numerals as the parts of the first embodiment. Moreover, the descriptions of the parts of the alternate embodiment that are identical to the parts of the first embodiment may be omitted for the sake of brevity.

Second Embodiment

The principle of the capillary pressure as described above is also applicable to a hydrodynamic bearing type rotary device according to another embodiment. With reference to FIG. 14, a hydrodynamic bearing type rotary device 130 according to Embodiment 2 of the present invention will be described. FIG. 14 is a schematic diagram of a vertical cross section of the hydrodynamic bearing type rotary device 130 according to Embodiment 2 of the present invention. The hydrodynamic bearing type rotary device 130 according to Embodiment 2 has a so-called flangeless type hydrodynamic bearing mechanism 140. Hereinafter, a structure different from the hydrodynamic bearing type rotary device 30 according to Embodiment 1 will be mainly discussed.

As shown in FIG. 14, in the hydrodynamic bearing type rotary device 130, no flange is fixed to an end on the lower side in the axial direction of a shaft 102. On an outer peripheral surface of the shaft 102, radial dynamic pressure generating grooves 102B are formed. A radial bearing portion 121 is formed between the shaft 102 and the sleeve 101. A thrust plate 104 has thrust dynamic pressure generating grooves 104A formed on a portion opposing an end surface on the lower side in the axial direction of the shaft 102. A thrust bearing portion 122 is formed between the thrust plate 104 and the shaft 102.

In the hydrodynamic bearing type rotary device 130, a seal cap 105 includes a tubular portion 105A and a cap portion 105B. To an end on the lower side in the axial direction of the tubular portion 105A, the thrust plate 104 is fixed. On an inner periphery of the tubular portion 105A, the sleeve 101 is fitted. The sleeve 101 has a circular recessed portion 101C extending in a radial direction which is formed on an end surface on the lower side in the axial direction. The thrust plate 104 and the recessed portion 101C form a first fluid reservoir F, which is a circular space. A second fluid reservoir H, which is a circular space, is formed between the cap portion 105B and an end surface on the upper side in the axial direction of the sleeve 101. The first fluid reservoir F and the second fluid reservoir H communicate with the radial bearing portion 121. On an outer peripheral side of the sleeve 101, a communication groove 101A is formed. The tubular portion 105A and the communication groove 101A form the communication hole G. The first fluid reservoir F and the second fluid reservoir H are connected by the communication hole G. In the present embodiment, a cross section of the communication hole G has a substantially rectangular shape. As a lubricating fluid, oil 106 is filled in gaps between the components.

Examples of calculation models for capillary pressures at respective portions of the hydrodynamic bearing type rotary device 130 according to the present embodiment will be described.

For the capillary pressure Ph [Pa] at the second fluid reservoir H, Calculation Model 1 described above can be applied. The capillary pressure Ph can be represented by above Expression (4). For the capillary pressure Pf [Pa] at the first fluid reservoir F, Calculation Model 2 is applied in the above Embodiment 1. However, in the present embodiment, the first fluid reservoir F is a space of a shape of a thin disc similarly to the second fluid reservoir H. Therefore, Calculation Model 1 can also be applied, and the capillary pressure can be represented by above Expression (4).

Regarding the capillary pressure Pg [Pa] at the communication hole G, the cross section of the communication hole G of the present embodiment has a substantially rectangular shape while the communication hole G in Embodiment 1 has a circular shape. Thus, Calculation Model 3 cannot be applied as it is.

Figure 15:
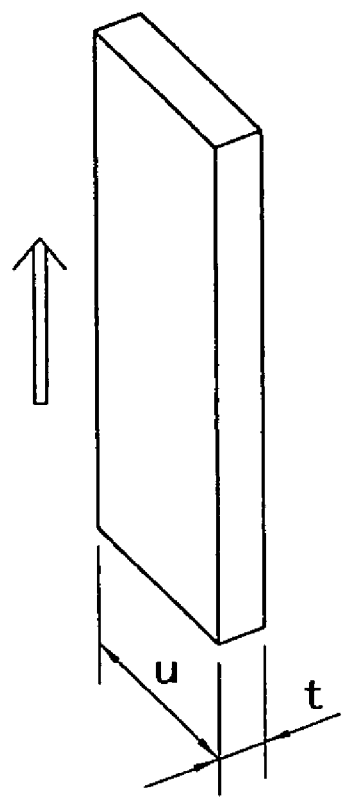
FIG. 15 is a diagram illustrating Calculation Model 4.
Figure 16:
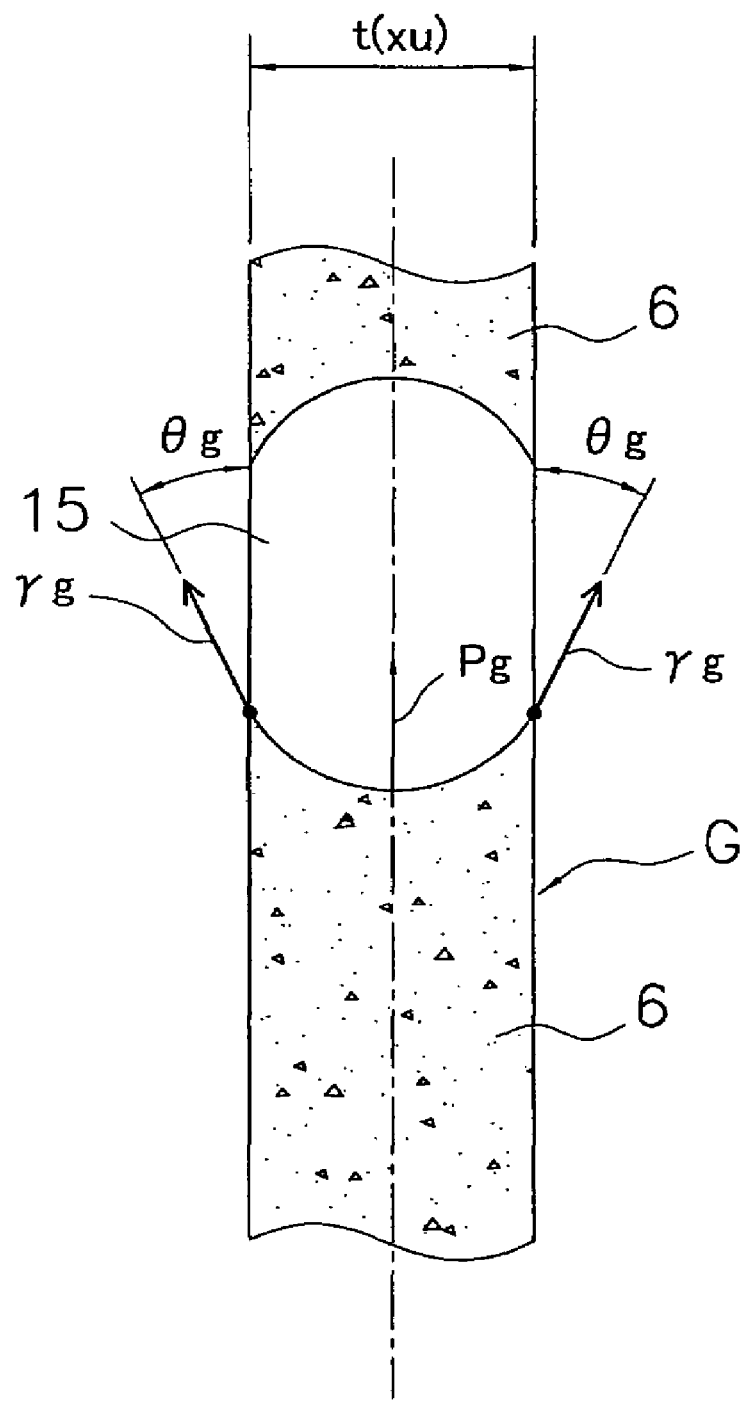
FIG. 16 is a cross sectional view along a plane including a rotation center of Calculation Model 4.

Therefore, new Calculation Model 4 is considered here. As shown in FIG. 15, in Calculation Model 4, a space having a cross section of a substantially rectangular shape is considered. FIG. 15 shows a space of the communication hole G. When the above basic model is applied to Calculation Model 4 shown in FIG. 15, the model shown in FIG. 16 is obtained. FIG. 16 shows a cross sectional view of Calculation Model 4. In this case, the capillary pressure Pg [Pa] at the communication hole G, for example, is represented by following Expression (7).

$$Fg = 2 \times (u + t) \times \gamma g \times \cos\theta g \quad (7)$$

$$Ag = u \times t$$

$$Pg = Fg/Ag$$
$$= 2 \times \gamma g \times \cos\theta g \times (u + t)/(u \times t)$$

u: Dimension of one side of the communication hole G [m]
t: Dimension of the other side of the communication hole G [m]
γg: Surface tension of the oil 106 [N/m]
θg: Contact angle of the oil 106 [rad]
Pg: Capillary pressure [Pa]

Specifically, for example, in case of U=0.0012 [m], t=0.00006 [m], γg=0.00288 [N/m], and θg=0.2269 [rad], P=982 [Pa].

Based on the expressions (4) and (7) derived from above Calculation Models 1 and 4, the capillary pressures at the first fluid reservoir F, the communication hole G, and the second fluid reservoir H are calculated. Then, materials, dimensions, surface roughness of the components, type of the lubricating fluid and the like are determined such that the capillary pressures satisfy the relationship of above Expression (1) or (2). As a result, in the hydrodynamic bearing type rotary device 130, bubbles 115 in the oil 106 can flow from the first fluid reservoir F to the second fluid reservoir H through the communication hole G more easily, and it is ensured that the bubbles 115 are discharged from the radial bearing portion 121 and the thrust bearing portion 122. Particularly, when the device is designed to satisfy the relationship of Expression (1), the hydrodynamic bearing type rotary device with the smoothest flow of the bubbles 115 and with the highest discharging effects of the bubbles can be obtained.

Third Embodiment

Figure 17:
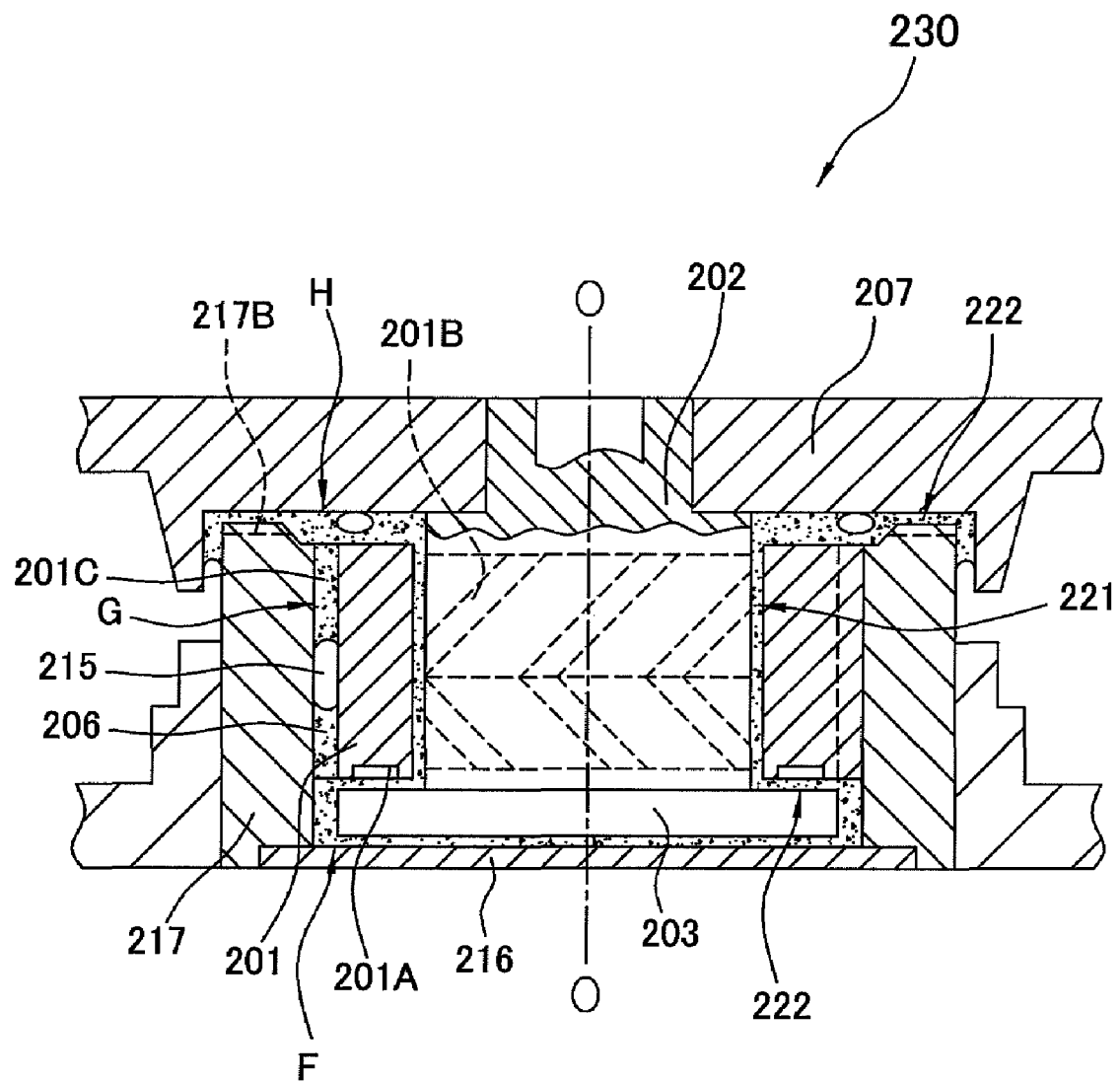
FIG. 17 is a schematic diagram of a vertical cross-section of a hydrodynamic bearing type rotary device according to Embodiment 3 of the present invention.

The principle of the capillary pressure as described above is also applicable to a hydrodynamic bearing type rotary device which will be described below. With reference to FIG. 17, a hydrodynamic bearing type rotary device 230 according to Embodiment 3 of the present invention will be described. FIG. 17 is a schematic diagram showing a vertical cross-section of the hydrodynamic bearing type rotary device 230 according to Embodiment 3 of the present invention. Hereinafter, a structure different from the hydrodynamic bearing type rotary device 30 according to Embodiment 1 will be mainly discussed.

The hydrodynamic bearing type rotary device 230 includes a first sleeve 201, a second sleeve 217, a shaft 202, a flange 203, a cover plate 216 which serves as a thrust plate (or a closure plate), oil 206, and a hub 207.

On an outer periphery of the first sleeve 201, a communication groove 201C is formed. To an inner periphery of the second sleeve 217, the first sleeve 201 is fitted. A communication hole G is formed by the communication groove 201C and the second sleeve 217. The communication hole G has a cross section of a substantially rectangular shape. On an end surface on the upper side in the axial direction of the second sleeve 217, thrust dynamic pressure generating grooves 217B are formed. A thrust bearing portion 222 is formed between the second sleeve 217 and the hub 207.

To an end portion on the lower side in the axial direction of the shaft 202, a flange 203 is fixed. The flange 203 opposes an end portion on the lower side in the axial direction of the second sleeve 217 in the axial direction. On an end surface on the lower side in the axial direction of the first sleeve 201, thrust dynamic pressure generating grooves 201A are formed. A thrust bearing portion 222 is formed between the first sleeve 201 and the flange 203. Further, on an outer peripheral surface of the shaft 202, radial dynamic pressure generating grooves 202B are formed. A radial bearing portion 221 is formed between the first sleeve 201 and the shaft 202. A first fluid reservoir F is formed between the first sleeve 201, the second sleeve 217, the flange 203, and the cover plate 216.

To an end portion on the upper side in the axial direction of the shaft 202, the hub 207 is fixed. A gap is secured between the hub 207 and the first sleeve 201 in the axial direction. A second fluid reservoir H, which is a circular space, is formed between the hub 207 and the first sleeve 201. The first fluid reservoir F and the second fluid reservoir H communicate with the radial bearing portion 221. Further, the first fluid reservoir F and the second fluid reservoir H communicate with each other through the communication hole G.

Examples of calculation models for capillary pressures at the respective portions of the hydrodynamic bearing type rotary device 230 according to the present embodiment will be described below.

For the capillary pressure at the second fluid reservoir H, Ph [Pa], above Calculation Model 1 can be applied. The capillary pressure Ph can be represented by above Expression (4). For the capillary pressure at the first fluid reservoir F, Pf [Pa], above Calculation Model 2 can be applied. The capillary pressure Pf can be represented by above Expression (5). For the capillary pressure at the communication hole G, Pg [Pa], above Calculation Model 4 can be applied since the cross section of the communication hole G has a substantially rectangular shape. The capillary pressure Pg can be represented by above Expression (4).

Based on Expressions (4), (5) and (7) derived from above Calculation Models 1, 2, and 4, the capillary pressures at the first fluid reservoir F, the communication hole G, and the second fluid reservoir H are calculated. Then, materials, dimensions, surface roughness of the components, type of the lubricating fluid and the like are determined such that the capillary pressures satisfy the relationship of above Expression (1) or (2). As a result, in the hydrodynamic bearing type rotary device 230, bubbles 215 in oil 206 can flow from the first fluid reservoir F to the second fluid reservoir H through the communication hole G more easily, and it is ensured that the bubbles 215 are discharged from the radial bearing portion 221 and the thrust bearing portion 222. Particularly, when the device is designed to satisfy the relationship of Expression (1), the hydrodynamic bearing type rotary device with the smoothest flow of the bubbles 215, and thus, the highest bubble discharging effect can be achieved.

The embodiments described above are merely examples of the present invention. Various modifications can be made without departing from the scope of the present invention.

The type of the hydrodynamic bearing type rotary device in the present invention is not limited to that described in the above embodiments. The present invention is applicable to any type of the hydrodynamic bearing type rotary device as long as it has three spaces of the first fluid reservoir F, the communication hole, and the second fluid reservoir H.

In the above embodiments, the capillary pressures are calculated based on Calculation Models 1 through 4. However, the above calculation models are merely examples for calculating the capillary pressures, and another calculation model may be employed to calculate a capillary pressure in accordance with the shape of a component of the hydrodynamic bearing type rotary device.

In the above embodiments, the lubricating fluid is described to be oil, but it is not limited to this. For example, highly fluidic grease or an ionic liquid may be used instead of oil.

In the above embodiments, examples of the materials of the sleeve and the shafts are shown, but they are not limited to these examples.

In the above embodiments, examples of applying the present invention to the hydrodynamic bearing mechanism 40 and the hydrodynamic bearing type rotary device 30 are described. However, the present invention is not limited to such examples.

Figure 18:
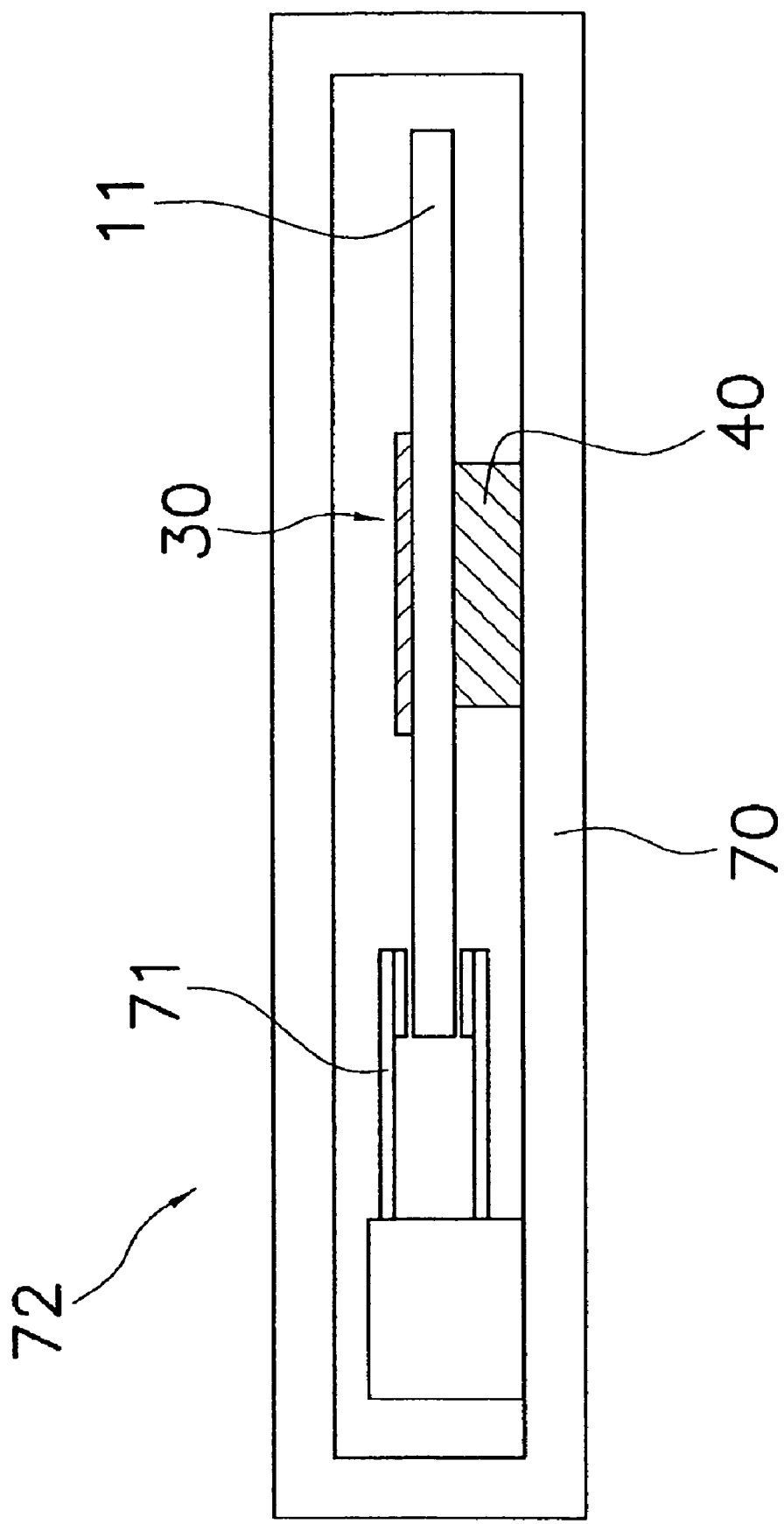
FIG. 18 is a schematic vertical cross-sectional view showing a structure of a recording and reproduction apparatus.

For example, as shown in FIG. 18, the present invention is also applicable to a recording and reproduction apparatus 72 which has a hydrodynamic bearing type rotary device 30 which has the above-described structure inside a housing 70, and which reproduces information recorded on a recording disc 11 or records information on the recording disc 11 by a recording head.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Terms that are expressed as "means-plus function" in the claims should include any structure that can be utilized to carry out the function of that part of the present invention. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A hydrodynamic bearing type rotary device, comprising:
 a sleeve having a bearing hole;
 a shaft placed in the bearing hole so as to be relatively rotatable;
 a seal cap fixed to one side in an axial direction of the sleeve;
 a thrust plate fixed to the other side in the axial direction of the sleeve;
 a radial bearing portion having radial dynamic pressure generating grooves on at least one of an outer peripheral surface of the shaft and an inner peripheral surface of the sleeve;
 a circular first fluid reservoir which communicates with the radial portion, and is formed between at least two of the sleeve, the shaft, and the thrust plate on the other side in the axial direction of the sleeve;
 a circular second fluid reservoir which communicates with the radial bearing portion, and is formed between the sleeve and the seal cap;

a communication hole formed in the sleeve which communicates the first and the second fluid reservoirs; and
a lubricating fluid held between the sleeve, the shaft, the seal cap and the thrust plate,
wherein a capillary pressure in the first fluid reservoir is higher than a capillary pressure in the second fluid reservoir.

2. A hydrodynamic bearing type rotary device according to claim 1, wherein the capillary pressure in the first fluid reservoir is higher than a capillary pressure in the communication hole.

3. A hydrodynamic bearing type rotary device according to claim 1, wherein the capillary pressure in the communication is higher hole than a capillary pressure in the second fluid reservoir.

4. A hydrodynamic bearing type rotary device according to claim 1, wherein:
the capillary pressure Pn [Pa] is represented by the following expression in case that the first or the second chamber has a shape of a thin disc, $Fn = 2\pi \times Dn \times \gamma n \times \cos \theta n$ $An = \pi \times Dn \times Sn$ $Pn = Fn/An$ Dn: Diameter of central position of a connection portion between the communication hole and the fluid reservoir [m]
γn: Surface tension of the lubricating fluid [N/m]
θn: Contact angle of the oil lubricating fluid [rad]
Sn: Dimension in the axial direction of the fluid reservoir [m]
Pn: Capillary pressure [Pa]; and
the capillary pressure Pn [Pa] is represented by the following expression in case that the first or the second chamber has a shape of a thin tube, $Fno = \pi \times Dno \times \gamma n \times \cos \theta n$ $Fni = \pi \times (Dno - 2 \times rn) \times \gamma n \times \cos \theta n$ $Fn = Fno + Fni$ $An = \pi \times (Dno^2 - Dni^2)/4$ $Pn = Fn/An$ Dno: Outer diameter of the fluid reservoir [m]
rn: Dimension in the radial direction of the fluid reservoir [m]
Dni: Inner diameter of the first chamber (Dno−2×rn) [m]
γn: Surface tension of the lubricating fluid [N/m]
θn: Contact angle of the lubricating fluid [rad]
Pn: Capillary pressure [Pa].

5. A hydrodynamic bearing type rotary device according to claim 1, wherein:
the capillary pressure Pn [Pa] is represented by the following expression in case that the connection hole has a cross section of a circular shape, $Fn = \pi \times Dn \times \gamma n \times \cos \theta n$ $An = \pi \times Dn^2/4$ $Pn = Fn/An$ Dn: Diameter of the communication hole [m]
γn: Surface tension of the lubricating fluid [N/m]
θn: Contact angle of the lubricating fluid [rad]
Pn: Capillary pressure [Pa]; and
the capillary pressure Pn [Pa] is represented by the following expression in case that the connection hole has a cross section of a substantially quadrangular shape, $Fn = 2 \times (u+t) \times \gamma n \times \cos \theta n$ $An = u \times t$ $Pn = Fn/An$ u: Dimension of one side of the communication hole [m]
t: Dimension of the other side of the communication hole [m]
γn: Surface tension of the lubricating fluid [N/m]
θn: Contact angle of the lubricating fluid [rad]
Pn: Capillary pressure [Pa].

6. A hydrodynamic bearing type rotary device according to claim 1, wherein:
the communication hole includes a tapered surface formed to have a cross-sectional area which becomes larger toward the adjacent fluid reservoir on at least one end in the axial direction.

7. A hydrodynamic bearing type rotary device according to claim 1, wherein:
a or the radial dynamic pressure generating grooves have a herringbone pattern asymmetrical in the axial direction so as to flow the lubricating fluid from the radial bearing portion to the communication hole through the first fluid reservoir.

8. A hydrodynamic bearing type rotary device according to claim 1, wherein:
the dimension in the axial direction of the second fluid reservoir becomes smaller toward the inside in the radial direction.

9. A hydrodynamic bearing type rotary device according to claim 1, wherein:
the seal cap includes a tapered portion formed so as to become closer to the sleeve toward the inside in the radial direction.

10. A hydrodynamic bearing type rotary device according to claim 1, further comprising:
a base for fixing the sleeve;
a stator to be fixed to the base;
a rotor magnet which is positioned so as to oppose the stator, and forms a magnetic circuit with the stator; and
a hub for fixing the rotor magnet, which is also fixed to the shaft.

11. A recording and reproduction apparatus, comprising:
a hydrodynamic bearing type rotary device according to claim 10;
a disc-shape recording medium fixed to the hub, which can record information; and
information access means for writing or reading information to or from a desired position on the recording medium.

12. A hydrodynamic bearing type rotary device, comprising:
a sleeve having a bearing hole;
a shaft placed in the bearing hole so as to be relatively rotatable;
a seal cap fixed to one side in an axial direction of the sleeve;
a thrust plate fixed to the other side in the axial direction of the sleeve;
a radial bearing portion having radial dynamic pressure generating grooves on at least one of an outer peripheral surface of the shaft and an inner peripheral surface of the sleeve;

a circular first fluid reservoir which communicates with the radial portion, and is formed between at least two of the sleeve, the shaft, and the thrust plate on the other side in the axial direction of the sleeve;

a circular second fluid reservoir which communicates with the radial bearing portion, and is formed between the sleeve and the seal cap;

a communication hole formed in the sleeve which communicates the first and the second fluid reservoirs; and a lubricating fluid held between the sleeve, the shaft, the seal cap and the thrust plate, wherein a capillary pressure in the first fluid reservoir is higher than a capillary pressure in the communication hole.

13. A hydrodynamic bearing type rotary device according to claim 12, wherein the capillary pressure in the communication is higher hole than a capillary pressure in the second fluid reservoir.

14. A hydrodynamic bearing type rotary device according to claim 12, wherein:

the capillary pressure Pn [Pa] is represented by the following expression in case that the first or the second chamber has a shape of a thin disc, $Fn = 2\pi \times Dn \times \gamma n \times \cos \theta n$ $An = \pi \times Dn \times Sn$ $Pn = Fn/An$ Dn: Diameter of central position of a connection portion between the communication hole and the fluid reservoir [m]
γn: Surface tension of the lubricating fluid [N/m]
θn: Contact angle of the oil lubricating fluid [rad]
Sn: Dimension in the axial direction of the fluid reservoir [m]
Pn: Capillary pressure [Pa]; and the capillary pressure Pn [Pa] is represented by the following expression in case that the first or the second chamber has a shape of a thin tube, $Fno = \pi \times Dno \times \gamma n \times \cos \theta n$ $Fni = \pi \times (Dno - 2 \times rn) \times \gamma n \times \cos \theta n$ $Fn = Fno + Fni$ $An = \pi \times (Dno^2 - Dni^2)/4$ $Pn = Fn/An$ Dno: Outer diameter of the fluid reservoir [m]
rn: Dimension in the radial direction of the fluid reservoir [m]
Dni: Inner diameter of the first chamber (Dno−2×rn) [m]
γn: Surface tension of the lubricating fluid [N/m]
θn: Contact angle of the lubricating fluid [rad]
Pn: Capillary pressure [Pa].

15. A hydrodynamic bearing type rotary device according to claim 12, wherein:

the capillary pressure Pn [Pa] is represented by the following expression in case that the connection hole has a cross section of a circular shape, $Fn = \pi \times Dn \times \gamma n \times \cos \theta n$ $An = \pi \times Dn^2/4$ $Pn = Fn/An$ Dn: Diameter of the communication hole [m]
γn: Surface tension of the lubricating fluid [N/m]
θn: Contact angle of the lubricating fluid [rad]
Pn: Capillary pressure [Pa]; and the capillary pressure Pn [Pa] is represented by the following expression in case that the connection hole has a cross section of a substantially quadrangular shape, $Fn = 2 \times (u+t) \times \gamma n \times \cos \theta n$ $An = u \times t$ $Pn = Fn/An$ u: Dimension of one side of the communication hole [m]
t: Dimension of the other side of the communication hole [m]
γn: Surface tension of the lubricating fluid [N/m]
θn: Contact angle of the lubricating fluid [rad]
Pn: Capillary pressure [Pa].

16. A hydrodynamic bearing type rotary device, comprising:

a sleeve having a bearing hole;

a shaft placed in the bearing hole so as to be relatively rotatable;

a seal cap fixed to one side in an axial direction of the sleeve;

a thrust plate fixed to the other side in the axial direction of the sleeve;

a radial bearing portion having radial dynamic pressure generating grooves on at least one of an outer peripheral surface of the shaft and an inner peripheral surface of the sleeve;

a circular first fluid reservoir which communicates with the radial portion, and is formed between at least two of the sleeve, the shaft, and the thrust plate on the other side in the axial direction of the sleeve;

a circular second fluid reservoir which communicates with the radial bearing portion, and is formed between the sleeve and the seal cap;

a communication hole formed in the sleeve which communicates the first and the second fluid reservoirs; and a lubricating fluid held between the sleeve, the shaft, the seal cap and the thrust plate, wherein a capillary pressure in the communication hole is higher than a capillary pressure in the second fluid reservoir.

17. A hydrodynamic bearing type rotary device according to claim 16, wherein:

the capillary pressure Pn [Pa] is represented by the following expression in case that the first or the second chamber has a shape of a thin disc, $Fn = 2\pi \times Dn \times \gamma n \times \cos \theta n$ $An = \pi \times Dn \times Sn$ $Pn = Fn/An$ Dn: Diameter of central position of a connection portion between the communication hole and the fluid reservoir [m]
γn: Surface tension of the lubricating fluid [N/m]
θn: Contact angle of the oil lubricating fluid [rad]
Sn: Dimension in the axial direction of the fluid reservoir [m]

Pn: Capillary pressure [Pa]; and the capillary pressure Pn [Pa] is represented by the following expression in case that the first or the second chamber has a shape of a thin tube, $$Fno = \pi \times Dno \times \gamma n \times \cos \theta n$$

$$Fni = \pi \times (Dno - 2 \times rn) \times \gamma n \times \cos \theta n$$

$$Fn = Fno + Fni$$

$$An = \pi \times (Dno^2 - Dni^2)/4$$

$$Pn = Fn/An$$

Dno: Outer diameter of the fluid reservoir [m]
rn: Dimension in the radial direction of the fluid reservoir [m]
Dni: Inner diameter of the first chamber (Dno−2×rn) [m]
γn: Surface tension of the lubricating fluid [N/m]
θn: Contact angle of the lubricating fluid [rad]
Pn: Capillary pressure [Pa].

18. A hydrodynamic bearing type rotary device, comprising:
a sleeve having a bearing hole;
a shaft placed in the bearing hole so as to be relatively rotatable;
a hub fixed to one side in an axial direction of the shaft;
a thrust plate or closure plate fixed to the other side in the axial direction of the sleeve;
a radial bearing portion having radial dynamic pressure generating grooves on at least one of an outer peripheral surface of the shaft and an inner peripheral surface of the sleeve;
a circular first fluid reservoir which communicates with the radial portion, and is formed between at least two of the sleeve, the shaft, and the thrust plate or closure plate on the other side in the axial direction of the sleeve;
a circular second fluid reservoir which communicates with the radial bearing portion, and is formed between the sleeve and the hub;
a communication hole formed in the sleeve which communicates the first and the second fluid reservoirs; and
a lubricating fluid held between the sleeve, the shaft, the hub and the thrust plate or closure plate,
wherein a capillary pressure in the first fluid reservoir is higher than a capillary pressure in the second fluid reservoir.

19. A hydrodynamic bearing type rotary device, comprising:
a sleeve having a bearing hole;
a shaft placed in the bearing hole so as to be relatively rotatable;
a hub fixed to one side in an axial direction of the shaft;
a thrust plate or closure plate fixed to the other side in the axial direction of the sleeve;
a radial bearing portion having radial dynamic pressure generating grooves on at least one of an outer peripheral surface of the shaft and an inner peripheral surface of the sleeve;
a circular first fluid reservoir which communicates with the radial portion, and is formed between at least two of the sleeve, the shaft, and the thrust plate or closure plate on the other side in the axial direction of the sleeve;
a circular second fluid reservoir which communicates with the radial bearing portion, and is formed between the sleeve and the hub;
a communication hole formed in the sleeve which communicates the first and the second fluid reservoirs; and
a lubricating fluid held between the sleeve, the shaft, the hub and the thrust plate or closure plate,
wherein a capillary pressure in the first fluid reservoir is higher than a capillary pressure in the communication hole.

20. A hydrodynamic bearing type rotary device, comprising:
a sleeve having a bearing hole;
a shaft placed in the bearing hole so as to be relatively rotatable;
a hub fixed to one side in an axial direction of the shaft;
a thrust plate or closure plate fixed to the other side in the axial direction of the sleeve;
a radial bearing portion having radial dynamic pressure generating grooves on at least one of an outer peripheral surface of the shaft and an inner peripheral surface of the sleeve;
a circular first fluid reservoir which communicates with the radial portion, and is formed between at least two of the sleeve, the shaft, and the thrust plate or closure plate on the other side in the axial direction of the sleeve;
a circular second fluid reservoir which communicates with the radial bearing portion, and is formed between the sleeve and the hub;
a communication hole formed in the sleeve which communicates the first and the second fluid reservoirs; and
a lubricating fluid held between the sleeve, the shaft, the hub and the thrust plate or closure plate,
wherein a capillary pressure in the communication hole is higher than a capillary pressure in the second fluid reservoir.

* * * * *